(12) United States Patent
Ishidate et al.

(10) Patent No.: US 10,254,677 B2
(45) Date of Patent: Apr. 9, 2019

(54) LIGHT SCANNING APPARATUS

(71) Applicant: CANON KABUSHIKI KAISHA, Tokyo (JP)

(72) Inventors: Takehiro Ishidate, Tokyo (JP); Genichiro Kudo, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/147,185

(22) Filed: Sep. 28, 2018

(65) Prior Publication Data

US 2019/0033747 A1 Jan. 31, 2019

Related U.S. Application Data

(62) Division of application No. 15/674,415, filed on Aug. 10, 2017, now Pat. No. 10,156,808, which is a (Continued)

(30) Foreign Application Priority Data

Jan. 28, 2015 (JP) .................. 2015-014127

(51) Int. Cl.
*G02B 26/12* (2006.01)
*B41J 2/47* (2006.01)
*G03G 15/043* (2006.01)

(52) U.S. Cl.
CPC ......... *G03G 15/043* (2013.01); *G02B 26/123* (2013.01); *G02B 26/125* (2013.01);
(Continued)

(58) Field of Classification Search
CPC ............. G03G 15/043; G03G 15/0435; G02B 26/127; G02B 26/123; G02B 26/125; G02B 26/12; B41J 2/47
See application file for complete search history.

(56) References Cited

U.S. PATENT DOCUMENTS 5,801,370 A 9/1998 Katoh et al. ............. 235/467
6,856,338 B2 2/2005 Takahashi et al. ........ 347/225
(Continued)

FOREIGN PATENT DOCUMENTS

JP S47-33642 11/1972
JP 02-210319 A 8/1990
(Continued)

OTHER PUBLICATIONS

Computer-generated translation of JP 2013-109113, published on Jun. 2013 (Year: 2013).*
(Continued)

*Primary Examiner* — Huan H Tran
(74) *Attorney, Agent, or Firm* — Venable LLP

(57) ABSTRACT

A light scanning apparatus, including: a light source configured to emit a light beam; and a rotary polygon mirror configured to deflect the light beam emitted from the light source so that the light beam scans a surface of a photosensitive member, wherein the rotary polygon mirror is formed in a four-sided polygon, and wherein a difference between a pair of diametrically opposed interior angles of the rotary polygon mirror is larger than 0.03°, and a difference between another pair of diametrically opposed interior angles of the rotary polygon mirror is 0.03° or less.

6 Claims, 15 Drawing Sheets

Related U.S. Application Data division of application No. 15/000,854, filed on Jan. 19, 2016, now Pat. No. 9,772,577.

(52) U.S. Cl.
CPC ....... *G02B 26/127* (2013.01); *G03G 15/0435* (2013.01); *B41J 2/47* (2013.01); *G02B 26/12* (2013.01)

(56) References Cited

U.S. PATENT DOCUMENTS

| | | | |
|---|---|---|---|
| 6,919,978 B2 | 7/2005 | Kudo | 359/204 |
| 7,611,055 B1 | 11/2009 | Detwiler | 235/440 |
| 8,523,076 B2 | 9/2013 | Good | 235/462.32 |
| 8,947,478 B2 | 2/2015 | Ishidate et al. | 347/137 |
| 9,086,645 B2 | 7/2015 | Otoguro et al. | G03G 15/0435 |
| 9,195,063 B2 | 11/2015 | Ishidate et al. | G02B 26/125 |
| 9,517,638 B2 | 12/2016 | Otoguro et al. | B41J 2/471 |
| 9,772,577 B2* | 9/2017 | Ishidate | G03G 15/043 |
| 2008/0198435 A1 | 8/2008 | Nakahata | 359/201 |
| 2015/0212477 A1 | 7/2015 | Ishidate et al. | G03G 15/80 |
| 2015/0277082 A1 | 10/2015 | Otoguro et al. | G02B 7/181 |
| 2015/0293350 A1 | 10/2015 | Sato et al. | G02B 26/129 |
| 2016/0041472 A1 | 2/2016 | Kawashima | G03F 7/702 |

FOREIGN PATENT DOCUMENTS

| | | |
|---|---|---|
| JP | H10-200707 | 7/1998 |
| JP | H11-119141 | 4/1999 |
| JP | 2001-260413 | 9/2001 |
| JP | 2003-233026 | 8/2003 |
| JP | 2004-102276 | 4/2004 |
| JP | 2004-354626 | 12/2004 |
| JP | 2009-119871 | 6/2009 |
| JP | 2011-148142 | 8/2011 |
| JP | 2013-109113 | 6/2013 |
| JP | 2014-038165 | 2/2014 |

OTHER PUBLICATIONS

Computer-generated machine translation of Japan 2739690 (B2) published Apr. 15, 1998.
JP Office Action dated Oct. 25, 2018 in counterpart JP Application No. 2015-014127 with English translation.

* cited by examiner

REFLECTION SURFACE IDENTIFYING LIMIT OF DEFORMED ROTARY POLYGON MIRROR 113

ANGLE EQUIVALENT VALUE INTO WHICH BD SIGNAL PERIOD DEVIATION MANUFACTURING ERROR IS CONVERTED

LIGHT SCANNING APPARATUS

This application is a division of application Ser. No. 15/674,415 filed Aug. 10, 2017, currently pending, which is a division of application Ser. No. 15/000,854 filed Jan. 19, 2016, now issued as U.S. Pat. No. 9,772,577 on Sep. 26, 2017; and claims priority under 35 U.S.C. § 119 to Japan Application 2015-014127 filed in Japan on Jan. 28, 2015; and the contents of all of which are incorporated herein by reference as if set forth in full.

BACKGROUND OF THE INVENTION

Field of the Invention

The present invention relates to a light scanning apparatus including a rotary polygon mirror.

Description of the Related Art

Hitherto, an electrophotographic image forming apparatus such as a digital copying machine, a laser beam printer, or a facsimile apparatus includes a light scanning apparatus. The light scanning apparatus scans a surface of a photosensitive drum (hereinafter referred to as "photosensitive member") with a laser beam (hereinafter referred to as "light beam") modulated according to the image information, to thereby form an electrostatic latent image thereon. The electrostatic latent image is developed by a developing device into a toner image with developer (hereinafter referred to as "toner"). The toner image on the photosensitive member is transferred onto a recording medium, such as a paper sheet, by a transfer device. A fixing device fixes the toner image transferred onto the recording medium, to thereby form an image on the recording medium.

The light scanning apparatus includes a light source configured to emit a light beam and a rotary polygon mirror configured to deflect the light beam emitted from the light source so that the light beam scans a photosensitive member. The light scanning apparatus generates a synchronizing signal (hereinafter referred to as "BD signal") in a main-scanning direction in order to maintain the same image writing start position (scan starting position) on the photosensitive member with respect to each scan. When the light beam enters a beam detector (hereinafter referred to as "BD"), the BD signal is output from the BD.

The rotary polygon mirror has a plurality of reflection surfaces, and is manufactured (processed) so that the respective reflection surfaces have the same optical characteristic. However, due to a manufacturing error, the optical characteristic of any one of the reflection surfaces may differ from the optical characteristic of another reflection surface (in reflectance or in angle of the reflection surface with respect to a rotation axis). In view of this, the reflection surface of the rotary polygon mirror is identified to correct the optical characteristic of the reflection surface (Japanese Patent Application Laid-Open No. 2001-260413). In order to identify the reflection surface of the rotary polygon mirror, some apparatus use the BD signal (Japanese Patent Application Laid-Open No. 2013-109113). In general, the rotary polygon mirror is formed in a regular polygonal shape. However, in Japanese Patent Application Laid-Open No. 2013-109113, in order to facilitate the identification of the reflection surface with use of the BD signal, the rotary polygon mirror is formed in a non-regular polygonal shape so as to provide a difference between a first interior angle and a second interior angle that are adjacent to each other.

However, when the difference between the interior angles of the rotary polygon mirror is small, the manufacturing error may cause repetitive occurrence of the same pattern in a BD signal period per revolution of the rotary polygon mirror. In such a case, it is difficult to identify the reflection surface. On the other hand, when the difference between the interior angles of the rotary polygon mirror is large, identification of the reflection surface is facilitated, but image defects may be caused.

SUMMARY OF THE INVENTION

In view of this, the present invention provides a light scanning apparatus configured to prevent image defects and facilitating identification of a reflection surface regardless of a manufacturing error in a rotary polygon mirror having different interior angles.

In order to solve the above-mentioned problems, according to one embodiment of the present invention, there is provided a light scanning apparatus, comprising:

a light source configured to emit a light beam; and a rotary polygon mirror configured to deflect the light beam emitted from the light source so that the light beam scans a surface of a photosensitive member, wherein the rotary polygon mirror is formed in a four-sided polygon, and wherein a difference between a pair of diametrically opposed interior angles of the rotary polygon mirror is larger than $0.03°$, and a difference between another pair of diametrically opposed interior angles of the rotary polygon mirror is $0.03°$ or less.

Further features of the present invention will become apparent from the following description of exemplary embodiments with reference to the attached drawings.

DESCRIPTION OF THE EMBODIMENTS

Now, modes for carrying out the present invention will be described in detail based on embodiments.

First Embodiment (Image Forming Apparatus)

Figure 2:
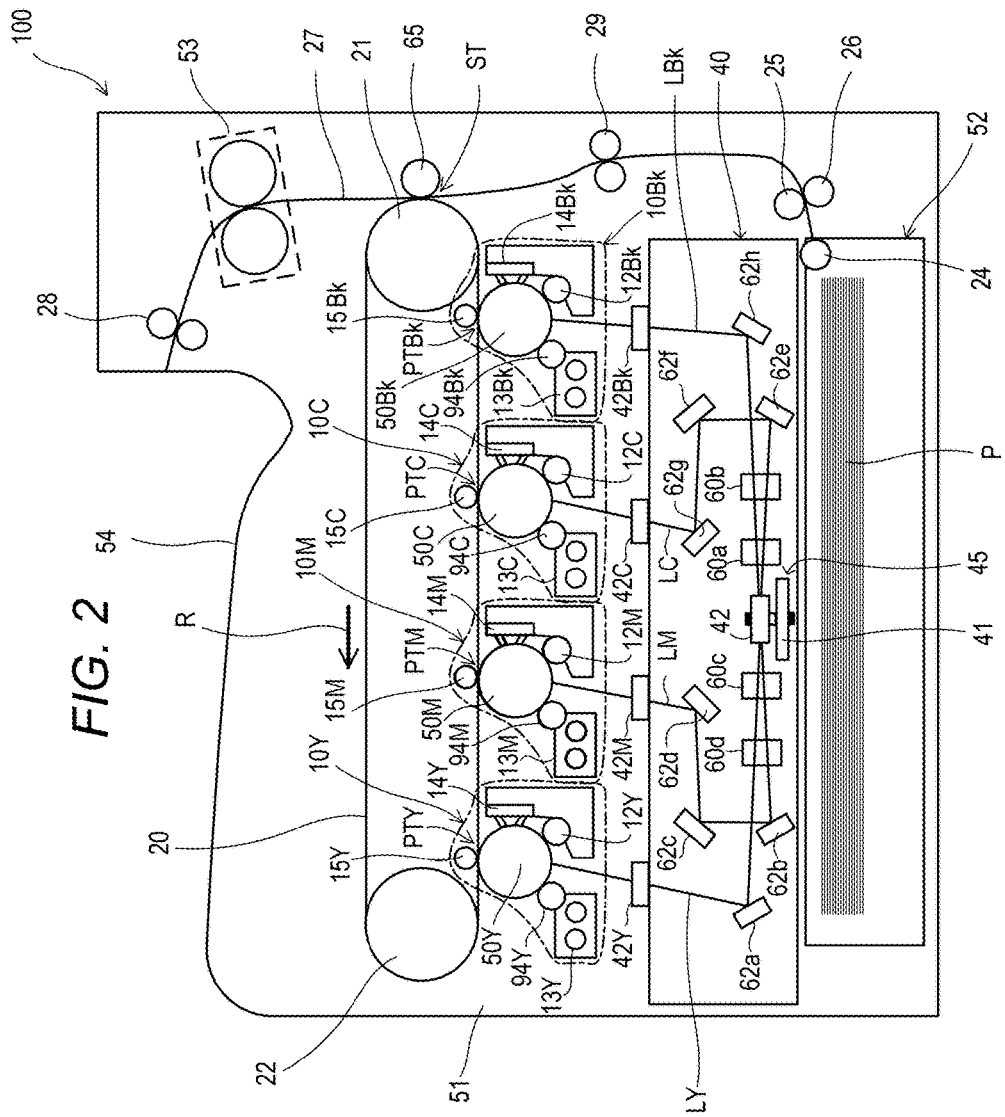
FIG. 2 is a sectional view of an image forming apparatus.

An electrophotographic image forming apparatus (hereinafter referred to as "image forming apparatus") 100 according to the embodiment will be described. FIG. 2 is a sectional view of the image forming apparatus 100. As an example of the image forming apparatus 100, a tandem-type color laser beam printer is illustrated. The image forming apparatus 100 is configured to form an image on a recording medium (hereinafter referred to as "sheet") P using an electrophotographic method. The image forming apparatus 100 includes four image forming portions 10 (10Y, 10M, 10C, 10Bk). The suffixes Y, M, C, and Bk of the reference symbols indicate yellow, magenta, cyan, and black, respectively. In the following description, the suffixes Y, M, C, and Bk may be omitted.

The image forming portions 10 each include a photosensitive drum serving as an image bearing member (hereinafter referred to as "photosensitive member") 50 (50Y, 50M, 50C, 50Bk). A process member configured to act on the photosensitive member 50 is arranged around each of the photosensitive members 50. Specifically, a charging roller (charging device) 12 (12Y, 12M, 12C, 12Bk), a developing device 13 (13Y, 13M, 13C, 13Bk), and a primary transfer roller (primary transfer member) 15 (15Y, 15M, 15C, 15Bk) are arranged around the photosensitive member 50. A light scanning apparatus (exposure apparatus) 40 is arranged below the four image forming portions 10.

The charging roller (charging member) 12, to which a charging bias is applied, uniformly charges a surface of the photosensitive member 50. The developing device 13 includes a developing roller (developer carrying unit) 94 (94Y, 94M, 94C, 94Bk) configured to carry developer (toner) of each color. The developing roller (developing unit) 94, to which a developing bias is applied, develops an electrostatic latent image formed on the surface of the photosensitive member 50 (on the photosensitive member) with the toner into a toner image.

The image forming apparatus 100 includes an intermediate transfer belt (intermediate transfer member) 20 onto which toner images of a plurality of colors are primarily transferred from the respective image forming portions 10. The intermediate transfer belt 20 is arranged above the four image forming portions 10. The intermediate transfer belt 20 is an endless belt, which is stretched around a pair of belt conveyance rollers 21 and 22. The intermediate transfer belt 20 is rotated in a direction indicated by the arrow R.

The primary transfer roller 15 is arranged so as to face the photosensitive member 50 of the image forming portion 10 across the intermediate transfer belt 20. The primary transfer roller 15 forms a primary transfer portion PT (PTY, PTM, PTC, PTBk) between the intermediate transfer belt 20 and the photosensitive member 50. By application of a transfer voltage to the primary transfer roller 15, the toner image on the photosensitive member 50 is primarily transferred onto the intermediate transfer belt 20.

The four image forming portions 10Y, 10M, 10C, and 10Bk are arranged in line below the intermediate transfer belt 20. Along the rotational direction R of the intermediate transfer belt 20, the yellow image forming portion 10Y, the magenta image forming portion 10M, the cyan image forming portion 10C, and the black image forming portion 10Bk are arranged in the stated order. The image forming portions 10 form a yellow toner image, a magenta toner image, a cyan toner image, and a black toner image with the toners of the respective colors. A secondary transfer roller (transfer unit) 65 is arranged so as to face the belt conveyance roller 21 across the intermediate transfer belt 20, to thereby form a secondary transfer portion ST between the intermediate transfer belt 20 and the secondary transfer roller 65.

A sheet feeding cassette 52 configured to receive the sheets P (recording media) is provided at a lower portion of a main body 51 of the image forming apparatus 100. The sheet feeding cassette 52 is removably mounted to the lower portion of the main body 51 from a side surface of the main body 51. A pickup roller 24 and a feed roller 25 are provided above the sheet feeding cassette 52. The pickup roller 24 and the feed roller 25 are configured to feed the sheets P received in the sheet feeding cassette 52 one by one. A retard roller 26 is arranged so as to face the feed roller 25 in order to prevent multifeeding of the sheets P.

A conveyance route 27 of the sheet P in an interior of the main body 51 is formed so as to be substantially vertical along a right side surface of the main body 51 illustrated in FIG. 2. A registration roller pair 29, the secondary transfer portion ST, a fixing device 53, and a delivery roller pair 28 are provided in the conveyance route 27.

(Image Forming Process)

Now, an image forming process in the image forming apparatus 100 will be described. The charging roller 12 uniformly charges a surface of the photosensitive member 50. The light scanning apparatus 40 exposes the uniformly charged surface of the photosensitive member 50 to laser light (hereinafter referred to as "light beam") L (LY, LM, LC, LBk), which is modulated according to image information of each color. With this, an electrostatic latent image is formed on the surface of the photosensitive member 50. The developing device 13 develops the electrostatic latent image with the toner of each color, to thereby form the toner image of each color on the photosensitive member 50. The toner images of the four colors formed by the four image forming portions 10 are primarily transferred by the primary transfer rollers 15 onto the intermediate transfer belt 20 rotated in the rotational direction R, and are then superimposed on the intermediate transfer belt 20. The toner (transfer residual toner) remaining on the photosensitive member 50 after the primary transfer is collected by a cleaning device 14 (14Y, 14M, 14C, 14Bk).

On the other hand, the sheet P is fed to the registration roller pair 29 from the sheet feeding cassette 52 by the pickup roller 24 and the feed roller 25. The registration roller pair 29 conveys the sheet P to the secondary transfer portion ST between the secondary transfer roller 65 and the intermediate transfer belt 20 in synchronization with the toner images superimposed on the intermediate transfer belt 20.

The toner images superimposed on the intermediate transfer belt 20 are secondarily transferred onto the sheet P collectively in the secondary transfer portion ST. The toner remaining on the intermediate transfer belt 20 without being transferred onto the sheet P during the secondary transfer is collected by a cleaning mechanism (not shown) of the intermediate transfer belt 20. The sheet P having the toner image transferred thereon is conveyed to the fixing device 53 arranged upstream of the secondary transfer portion ST along the conveyance route 27.

The fixing device 53 heats and pressurizes the sheet P, to thereby fix the toner images onto the sheet P. In this manner, a full-color image is formed on the sheet P. The sheet P having the full-color image formed thereon is delivered onto a delivery tray 54 provided at an upper portion of the main body 51 by the delivery roller pair 28.

(Light Scanning Apparatus)

As described above, in a case of forming the full-color image by the image forming apparatus 100, the light scanning apparatus 40 is configured to expose the photosensitive members 50Y, 50M, 50C, and 50Bk of the respective image forming portions 10 to the light beams at respective predetermined timings based on the image information pieces of the respective colors. With this, the toner images of the respective colors are formed on the photosensitive members 50 based on the image information pieces of the respective colors. In order to obtain the full-color image with high quality, positions of the electrostatic latent images formed by the light scanning apparatus 40 need to be reproducibly aligned with high accuracy. In the embodiment, the light scanning apparatus 40 is shared by the four image forming portions 10Y, 10M, 10C, and 10Bk.

Figure 3A:
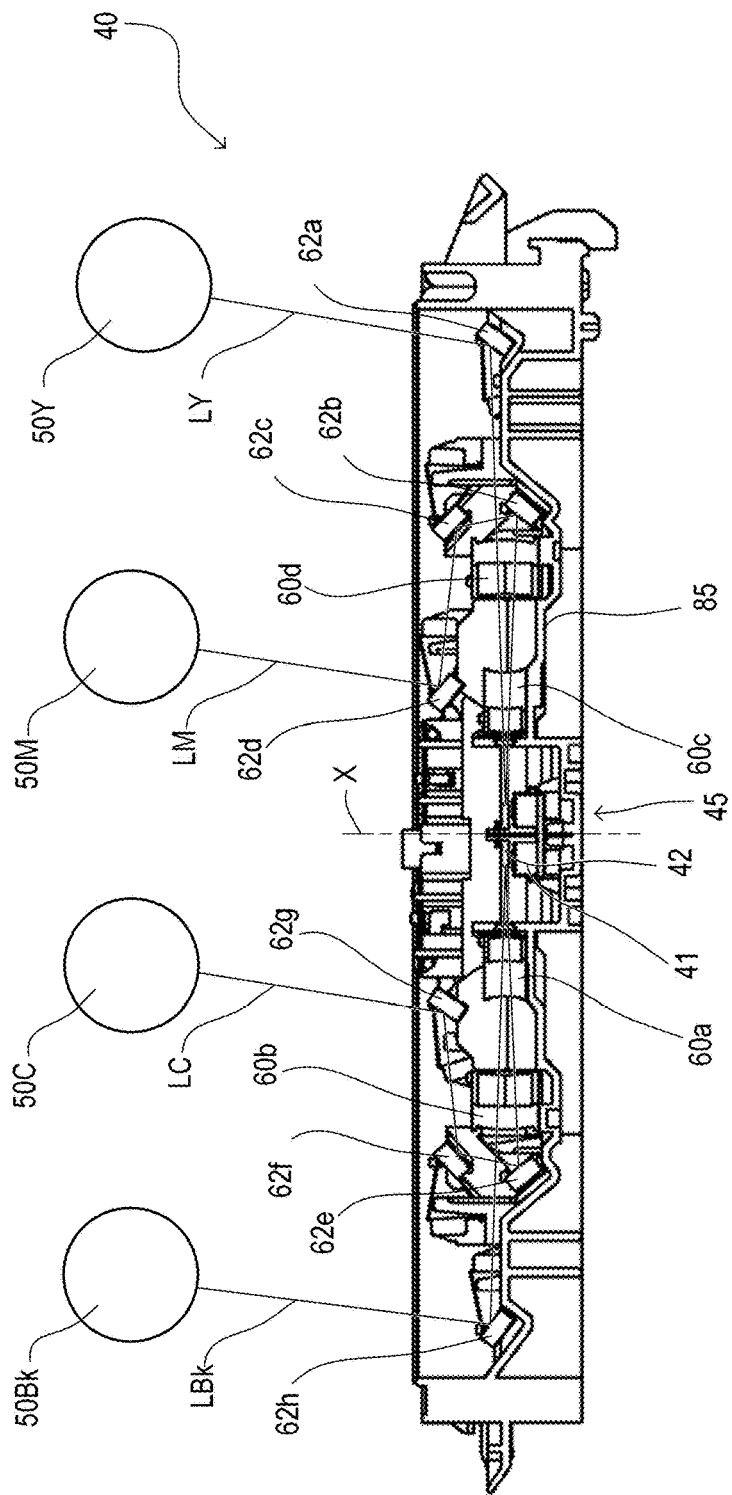
FIGS. 3A, 3B and 3C are views for illustrating a light scanning apparatus.
Figure 3B:
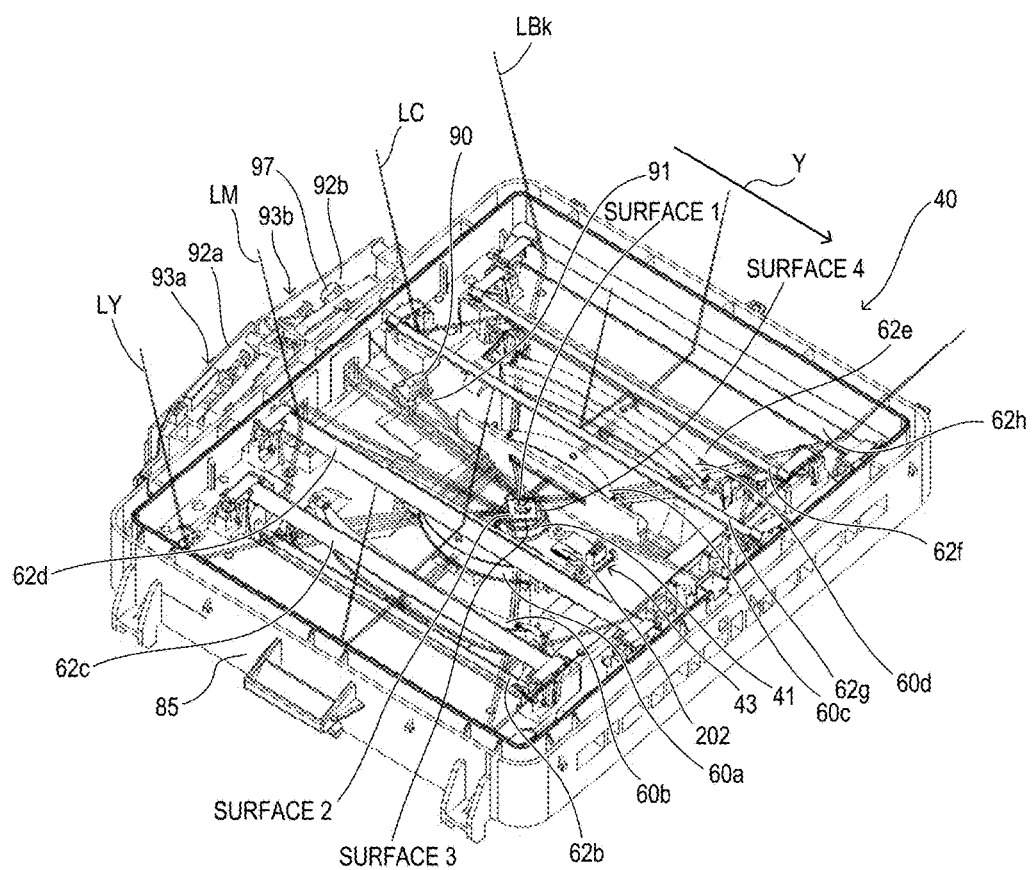
Figure 3C:
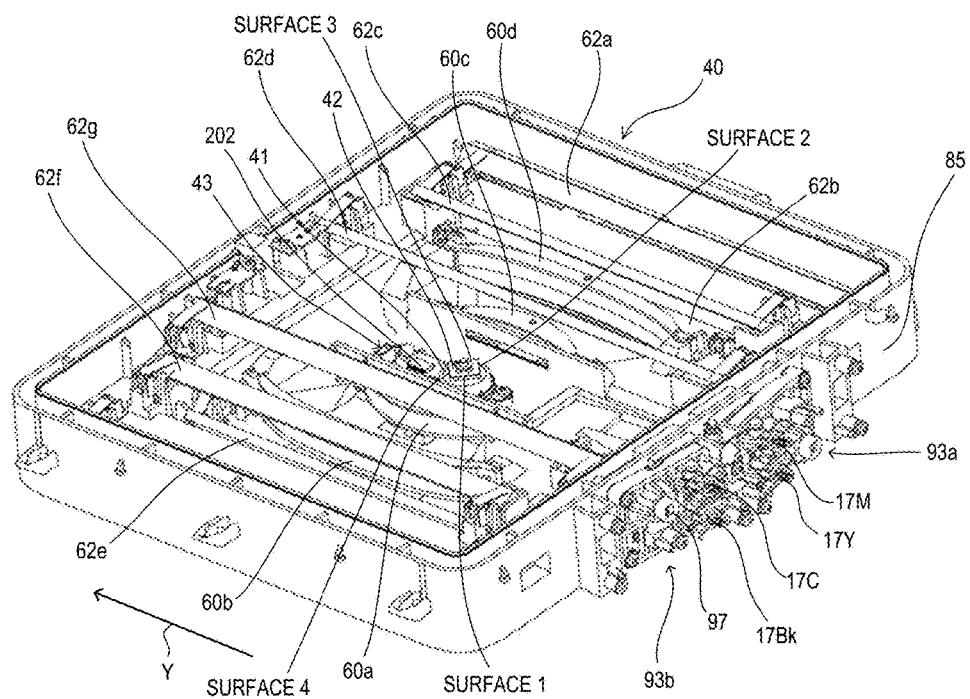

FIGS. 3A, 3B and 3C are views for illustrating the light scanning apparatus 40. FIG. 3A is a vertical sectional view of the light scanning apparatus 40. FIG. 3B is a perspective view of the light scanning apparatus 40 when viewed from a side thereof opposite to a light source unit 93 (93a, 93b). FIG. 3C is a perspective view of the light scanning apparatus 40 when viewed from a side thereof on which the light source unit 93 is provided. With reference to FIG. 2, FIGS. 3A, 3B and 3C, the light scanning apparatus 40 will be described below.

The light scanning apparatus 40 includes an optical box (hereinafter referred to as "housing") 85. The housing 85 includes the light source unit 93 (93a, 93b), a rotary polygon mirror 42, a lens 60 (60a, 60b, 60c, 60d), and a reflective mirror 62 (62a, 62b, 62c, 62d, 62e, 62f, 62g, 62h). The light scanning apparatus 40 includes four semiconductor lasers (hereinafter referred to as "light sources") 17 (17Y, 17M, 17C, 17Bk) each configured to emit a light beam modulated according to image information on each color. The light source unit 93a holds the light source 17Y configured to emit a light beam LY modulated according to the image information on yellow and the light source 17M configured to emit a light beam LM modulated according to the image information on magenta. The light source unit 93b holds the light source 17C configured to emit a light beam LC modulated according to the image information on cyan and the light source 17Bk configured to emit a light beam LBk modulated according to the image information on black.

The light scanning apparatus 40 includes a deflecting unit (deflector) 45 configured to deflect a light beam L in a central part of the housing 85. The deflecting unit 45 includes the rotary polygon mirror (deflecting member) 42, a motor 41 configured to rotate the rotary polygon mirror 42, and a circuit board 43 configured to drive the motor 41. The light beam L emitted from the light source 17 is emitted toward the rotary polygon mirror 42. The light beam L is deflected by the rotary polygon mirror 42 being rotated. The light beam L deflected by the rotary polygon mirror 42 is guided by optical members such as the lens 60 and the reflective mirror 62 installed inside the light scanning apparatus 40 so as to be introduced to the photosensitive member 50. The light beam L scans the surface of the photosensitive member 50 (photosensitive member) along a main-scanning direction (direction of a rotation axis of the photosensitive member 50) indicated by the arrow Y in FIG. 3B.

An optical path of each of the light beams LBk, LC, LM, and LY will be hereinafter described in detail. The light beam LY emitted from the light source 17Y corresponding to the photosensitive member 50Y is deflected by the rotary polygon mirror 42, and enters the lens 60c. The light beam LY which has passed through the lens 60c enters the lens 60d, passes through the lens 60d, and is then reflected by the reflective mirror 62a. The light beam LY reflected by the reflective mirror 62a passes through a transparent window 42Y, to thereby scan the photosensitive member 50Y.

The light beam LM emitted from the light source 17M corresponding to the photosensitive member 50M is deflected by the rotary polygon mirror 42, and enters the lens 60c. The light beam LM which has passed through the lens 60c enters the lens 60d, passes through the lens 60d, and is then reflected by the reflective mirror 62b, the reflective mirror 62c, and the reflective mirror 62d. The light beam LM reflected by the reflective mirror 62d passes through a transparent window 42M, to thereby scan the photosensitive member 50M.

The light beam LC emitted from the light source 17C corresponding to the photosensitive member 50C is deflected by the rotary polygon mirror 42, and enters the lens 60a. The light beam LC which has passed through the lens 60a enters the lens 60b, passes through the lens 60b, and is then reflected by the reflective mirror 62e, the reflective mirror 62f, and the reflective mirror 62g. The light beam LC reflected by the reflective mirror 62g passes through a transparent window 42C, to thereby scan the photosensitive member 50C.

The light beam LBk emitted from the light source 17Bk corresponding to the photosensitive member 50Bk is deflected by the rotary polygon mirror 42, and enters the lens 60a. The light beam LBk which has passed through the lens 60a enters the lens 60b, passes through the lens 60b, and is then reflected by the reflective mirror 62h. The light beam LBk reflected by the reflective mirror 62h passes through a transparent window 42Bk, to thereby scan the photosensitive member 50Bk.

(BD)

The light scanning apparatus 40 includes a beam detector (hereinafter referred to as "BD") 97 configured to generate a synchronizing signal (hereinafter referred to as "BD signal") in a main-scanning direction Y in order to maintain the same image writing start position (scan starting position) on the photosensitive member 50 with respect to each scan of the light beam L. The BD (signal generator) 97 is provided on a light source control substrate 92b of the light source unit 93b. The BD 97 is arranged on an image writing side of the main-scanning direction Y of the light beam LBk. The BD 97 receives the light beam LBk deflected by a reflection surface of the rotary polygon mirror 42, and generates a BD signal indicating an image writing position in the main-scanning direction Y of the light beam L with respect to the photosensitive member 50. The light beam LBk deflected by the rotary polygon mirror 42 passes through an optical path 91 at an edge part of the image writing side in the main-scanning direction Y, and is imaged on the BD 97 by a BD lens 90. When the light beam LBk passes over the BD 97, the BD signal is output from the BD 97. Therefore, at a time of image formation, the light source 17Bk needs to be turned on at a timing when the light beam LBk passes over the BD 97 for each scan.

Note that, timings when the image writing is started by the light beams LY, LM, and LC are also determined based on the BD signal of the light beam LBk. However, a BD may be provided to each of the light beams LY, LM, and LC. Alternatively, one BD may be provided to the light beams LY and LM, while another BD may be provided to the light beams LC and LBk.

In general, when the rotation of the stopped motor 41 is started, a synchronization detection writing (hereinafter referred to as "BD search") that determines the lighting-up timing of the light beam LBk entering the BD 97 is conducted. For example, when a print job is input to the image forming apparatus 100, first, the motor 41 configured to hold the rotary polygon mirror 42 of the deflecting unit 45 starts to rotate at a predetermined timing. Then, while the motor 41 is accelerating or when the motor 41 enters a steadily rotated state, the light source 17Bk is turned on, and the on-state of the light source 17Bk is maintained until the BD signal is output from the BD 97. When the BD signal is detected, the light source 17Bk is turned off. The light source 17Bk is turned on after a predetermined time period has elapsed since the BD signal is detected, and when the BD signal is detected again, the light source 17Bk is turned off. The turning on and off of the light source 17Bk are controlled at such a timing, to thereby obtain the BD signal for each scan.

The BD search is conducted, for example, before the image is written for the image formation on the first sheet in one job. The image writing start position in an axis direction (main-scanning direction Y) of the photosensitive drum 50 can be obtained from a rotational position of the rotary polygon mirror 42 at a time point when the BD signal is detected. For example, after the predetermined time period obtained in advance has elapsed since the BD signal is detected, when the emission of the light beam L modulated according to the image information is started, the same image writing start position on the photosensitive member 50 can be maintained with respect to each scan. As long as the rotary polygon mirror 42 is being steadily rotated with the predetermined rotation speed, it is possible to constantly grasp the rotational position of the rotary polygon mirror 42 based on the BD signal. By controlling the turning on and off of the light source 17 based on the BD signal, it is possible to maintain the same image writing start position with respect to each scan.

(Motor)

Figure 4:
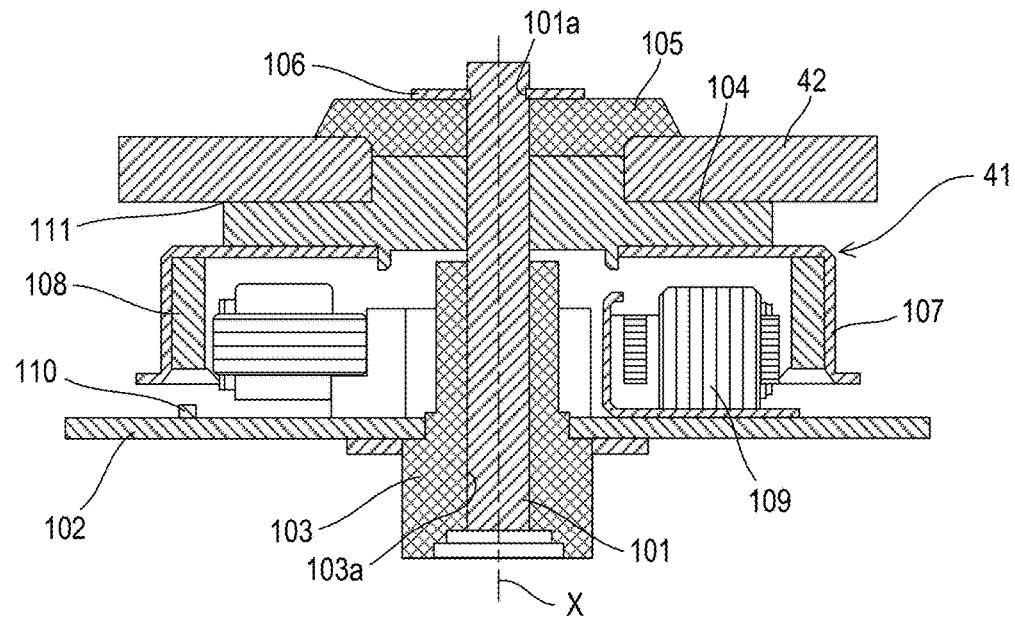
FIG. 4 is a sectional view of a motor configured to rotate a rotary polygon mirror.

FIG. 4 is a sectional view of the motor 41 configured to rotate the rotary polygon mirror 42. As illustrated in FIG. 4, the motor 41 includes a rotation shaft 101, a bearing 103, a rotor magnet (rotor) 108, a stator coil (stator) 109, and a Hall IC (rotation phase detecting portion) 110. A substrate (printed circuit board) 102 is fixed to the housing 85 of the light scanning apparatus 40. The bearing 103 is fixed to the substrate 102 by caulking or the like. The rotation shaft 101 is inserted into an inner diameter hole 103a of the bearing 103 so as to be rotatably supported by the bearing 103.

A rotor boss 104 is fixed to the rotation shaft 101. The rotor boss 104 includes a bearing surface portion 111. The rotary polygon mirror 42 is arranged on the rotor boss 104 with a lower surface of the rotary polygon mirror 42 held in contact with the bearing surface portion 111 of the rotor boss 104. A presser plate 105 is arranged on an upper surface of the rotary polygon mirror 42 so as to be held in contact therewith. A grip ring 106 is arranged on the presser plate 105 to be engaged with an annular groove 101a of the rotation shaft 101. The rotary polygon mirror 42 is sandwiched between the rotor boss 104 and the presser plate 105 to be fixed to the rotor boss 104, that is, the rotation shaft 101, by the grip ring 106.

A rotor frame 107 is fixed to a lower portion of the rotor boss 104. The rotor frame 107 has a cup shape obtained by drawing using a mold. The rotor magnet 108 is fixed to an inner periphery of the rotor frame 107. The rotor frame 107 is formed of a thin iron plate which allows high-precision drawing. The rotor magnet 108 is formed of a magnet made of rubber. The stator coil 109 is fixed onto the substrate 102. The stator coil 109 is arranged inside the rotor frame 107 so as to be opposed to the rotor magnet 108 in a direction orthogonal to an axis X of the rotation shaft 101.

The Hall IC 110 including the Hall element is arranged on the substrate 102. The Hall IC 110 is arranged so as to be opposed to the rotor magnet 108 in a direction parallel with the axis X of the rotation shaft 101. The rotary polygon mirror 42 is held by the rotation shaft 101 integrally with the rotor frame 107, the rotor magnet 108, the rotor boss 104, the presser plate 105, and the grip ring 106. The rotary polygon mirror 42 is rotated and stopped integrally with the rotor frame 107, the rotor magnet 108, the rotor boss 104, the presser plate 105, the grip ring 106, and the rotation shaft 101.

(Rotary Polygon Mirror)

The rotary polygon mirror 42 of the embodiment is a four-sided polygon mirror having reflection surfaces 1, 2, 3, and 4 (hereinafter also referred to as "surface 1", "surface 2", "surface 3", and "surface 4") (FIGS. 3B and 3C). The reflection surfaces 1, 2, 3, and 4 of the rotary polygon mirror 42 are formed by cutting so as to be parallel with the rotation shaft 101 of rotary polygon mirror 42. However, each of the reflection surfaces 1, 2, 3, and 4 may have a part that is not parallel with the rotation shaft 101 due to a processing error. Therefore, when light is reflected by the part that is not parallel with the rotation shaft 101, the light illumination position on the surface (surface to be scanned) of the photosensitive member 50 may be regularly deviated from the target position. This is called "optical face tangle error". This optical face tangle error causes periodical deviation of the illumination position in each of the reflection surfaces 1, 2, 3, and 4 of the rotary polygon mirror 42. Therefore, when an image is formed under a state with the optical face tangle error, periodical density unevenness occurs in the sub-scanning direction of the image, which leads to image deterioration. The optical face tangle error can be reduced by increasing the processing accuracy, but the processing cost is increased in this case.

In view of this, while the rotary polygon mirror 42 is rotating, the reflection surfaces 1, 2, 3, and 4 of the rotary polygon mirror 42 are identified, to thereby correct image data of a light beam scanning the reflection surface having the optical face tangle error. The image data is corrected so as to reduce the influence of scanning positional misalignment due to the reflection surface having the optical face tangle error. In addition to the optical face tangle error, as image deterioration components which are caused by slight processing accuracy error of the rotary polygon mirror 42, there are known a writing start position misalignment in the main-scanning direction Y, an image magnification deviation, and the like. If electrical correction of such image deterioration components is possible, improvement in image quality and reduction in manufacturing cost may be achieved.

The image deterioration components periodically appearing in each of the reflection surfaces 1, 2, 3, and 4 of the rotary polygon mirror 42 due to the processing accuracy can be corrected by performing electric correction control based on each of the reflection surfaces 1, 2, 3, and 4. Therefore, the reflection surfaces 1, 2, 3, and 4 of the rotary polygon mirror 42 are required to be reliably identified.

There has been proposed a method of identifying the reflection surfaces 1, 2, 3, and 4 of the rotating rotary polygon mirror 42 with use of a difference in period of the BD signal generated by the light beam L from each of the reflection surfaces 1, 2, 3, and 4 of the rotary polygon mirror 42. In general, the rotary polygon mirror 42 is formed with high accuracy so as to prevent a surface division error as much as possible, and thus there is a fear in that no period difference occurs in the BD signal among the reflection surfaces 1, 2, 3, and 4 of the rotary polygon mirror 42. In this case, there is a fear in that the reflection surfaces 1, 2, 3, and 4 of the rotary polygon mirror 42 cannot be identified. In view of this, there has been proposed a configuration in which the rotary polygon mirror 42 is intentionally formed in a non-regular polygonal shape instead of a regular polygonal shape. The non-regular polygonal shape herein refers to a shape obtained by slightly deforming a part of the regular polygonal shape. For example, the first interior angle and the second interior angle which are adjacent to each other of the rotary polygon mirror 42 are set different from each other, to thereby cause a period difference in the BD signal to enable identification of the reflection surfaces 1, 2, 3, and 4.

However, designing the adjacent first and second interior angles of the rotary polygon mirror 42 to be different from each other cannot be said enough for reliably identifying the reflection surfaces 1, 2, 3, and 4. The reason is as follows. Even when the rotary polygon mirror 42 is formed in a non-regular polygonal shape, and the adjacent first and second interior angles are set to be different from each other to cause the period difference in the BD signal, there are BD signal period difference patterns that inhibit identification of the reflection surfaces 1, 2, 3, and 4. In the following, the rotary polygon mirror that causes the BD signal period difference patterns that inhibit the identification of the reflection surfaces 1, 2, 3, and 4 will be described.

Figure 5A:
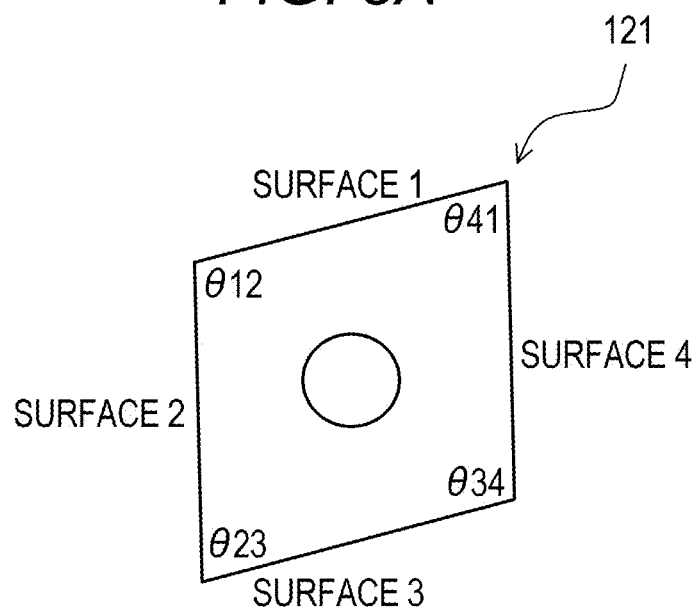
FIGS. 5A and 5B are explanatory diagrams of a rotary polygon mirror in which adjacent interior angles are different from each other but opposite angles are substantially equal to each other.
Figure 5B:
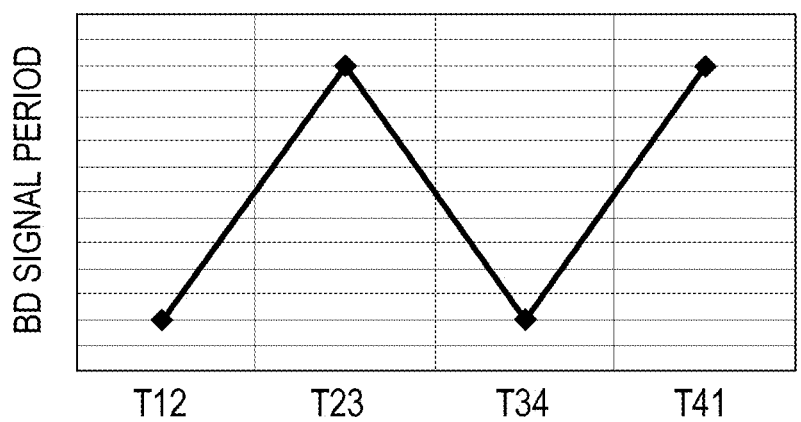

FIGS. 5A and 5B are explanatory diagrams of a rotary four-sided polygon mirror 121 in which adjacent interior angles are different from each other but opposite angles are substantially equal to each other. FIG. 5A is a plan view of the rotary four-sided polygon mirror 121. FIG. 5B is a graph for showing a BD signal period generated by the rotary four-sided polygon mirror 121. The rotary four-sided polygon mirror 121 has a parallelogram shape or a rhombic shape. The rotary four-sided polygon mirror 121 has, in the order of the rotation of the rotary four-sided polygon mirror 121 in the rotational direction (in a counterclockwise direction), a surface 1, a surface 2, a surface 3, and a surface 4. An interior angle formed between the surface 2 and the surface 3 is represented by a first interior angle $\theta 23$, an interior angle formed between the surface 3 and the surface 4 is represented by a second interior angle $\theta 34$, an interior angle formed between the surface 4 and the surface 1 is represented by a third interior angle $\theta 41$, and an interior angle formed between the surface 1 and the surface 2 is represented by a fourth interior angle $\theta 12$. The rotary four-sided polygon mirror 121 has, in the order of the rotation in the rotational direction (in the counterclockwise direction), the first interior angle $\theta 23$, the second interior angle $\theta 34$, the third interior angle $\theta 41$, and the fourth interior angle $\theta 12$. The vertex of each interior angle may be rounded. The rotary four-sided polygon mirror 121 illustrated in FIG. 5A has interior angle conditions as follows.

$\theta 12 \approx \theta 34$ $\theta 23 \approx \theta 41$

The first interior angle $\theta 23$ and the second interior angle $\theta 34$ which are adjacent to each other are different from each other. Similarly, the second interior angle $\theta 34$ and the third interior angle $\theta 41$, the third interior angle $\theta 41$ and the fourth interior angle $\theta 12$, and the fourth interior angle $\theta 12$ and the first interior angle $\theta 23$, which are respectively adjacent to each other, are different from each other. The first interior angle $\theta 23$ and the third interior angle $\theta 41$ which are opposed to each other are substantially equal to each other. Further, the second interior angle $\theta 34$ and the fourth interior angle $\theta 12$ which are opposed to each other are substantially equal to each other.

In FIG. 5B, the vertical axis represents time (BD signal period) required for switching the reflection surfaces 1, 2, 3, and 4 of the rotary four-sided polygon mirror 121 while the rotary four-sided polygon mirror 121 is rotating. Symbol T12 represents time required from the BD signal output of the surface 1 to the BD signal output of the surface 2. Symbol T23 represents time required from the BD signal output of the surface 2 to the BD signal output of the surface 3. Symbol T34 represents time required from the BD signal output of the surface 3 to the BD signal output of the surface 4. Symbol T41 represents time required from the BD signal output of the surface 4 to the BD signal output of the surface 1.

In this case, in the above-mentioned expressions representing the relationships of the interior angles of the rotary four-sided polygon mirror 121, the fourth interior angle $\theta 12$ and the second interior angle $\theta 34$ are not equal (=) to but substantially equal ($\approx$) to each other, and the first interior angle $\theta 23$ and the third interior angle $\theta 41$ are also not equal (=) to but substantially equal ($\approx$) to each other. The reason is as follows. Even when the interior angles are not equal to each other, the image forming apparatus 100 configured to detect the BD signal may detect that the BD signal periods are equal to each other. For example, when the image forming apparatus 100 configured to detect the BD signal has a low resolution, the image forming apparatus 100 may determine that the BD signal periods are equal to each other even with a larger angle deviation. In addition, the eccentricity of the reflection surfaces 1, 2, 3, and 4 of the rotary four-sided polygon mirror 121 with respect to the axial line X of the rotation shaft 101 also slightly affects the difference in BD signal period. By increasing the resolution of the image forming apparatus 100 configured to detect the BD signal, the difference in BD signal period can be detected even with a smaller angle difference. However, the increase in resolution leads to increase in cost of the components of the image forming apparatus 100, and hence is unrealistic.

As shown in FIG. 5B, the relationship between the time T12 and the time T23 is the same as the relationship between the time T34 and the time T41. That is, the BD signal period has the same periodicity for every two surfaces. As described above, even when the rotary four-sided polygon mirror 121 is formed in a non-regular polygonal shape to cause a difference in BD signal period, when the BD signal period has the same periodicity for every two surfaces, the image forming apparatus 100 configured to detect the BD signal cannot distinguish between the surface 1 and the surface 3 or between the surface 2 and the surface 4.

As described above, merely providing a difference in nominal angle between the first interior angle θ23 and the second interior angle θ34 which are adjacent to each other of the rotary polygon mirror 42 is insufficient because, due to the manufacturing error, the first interior angle θ23 and the third interior angle θ41 which are opposed to each other may become substantially equal to each other and the second interior angle θ34 and the fourth interior angle θ12 which are opposed to each other may become substantially equal to each other. As a result, the rotary polygon mirror 42 may become a parallelogram-shaped or rhombic-shaped rotary four-sided polygon mirror 121 as illustrated in FIG. 5A. In this case, as shown in FIG. 5B, a T12-T23 pattern formed by the time T12 and the time T23 and a T34-T41 pattern formed by the time T34 and the time T41 are equal to each other. That is, the BD signal period has the same periodicity for every two surfaces. In the embodiment, this case is referred to as "(2 surfaces)×(2 periods)". That is, (2 surfaces)×(2 periods) refers to a case where two equal patterns are generated in the BD signal period during one revolution of the rotary four-sided polygon mirror. In the case of (2 surfaces)×(2 periods), the surface 1 and the surface 3, or the surface 2 and the surface 4 cannot be discriminated from each other based on the difference in BD signal period.

Note that, as described above, the manufacturing error discussed herein includes more than such a surface division error accuracy that the interior angles of the rotary polygon mirror 42 are respectively different angles. The manufacturing error includes all factors that cause the difference in BD signal period, such as an eccentric accuracy in each of the reflection surfaces 1 to 4 of the rotary polygon mirror 42 with respect to the rotation shaft 101, a quantization error due to the resolution of the image forming apparatus 100 configured to detect the BD signal, and a surface accuracy difference of the rotary polygon mirror 42.

It is easily conceivable as a measure against the manufacturing error to increase the difference between the first interior angle θ23 and the second interior angle θ34 so as to increase the tolerance so that, even when the manufacturing error occurs, the BD signal period is reliably prevented from having the same periodicity for every two surfaces. However, this method has a problem in that the disadvantage of forming the rotary polygon mirror 42 into the non-regular polygonal shape is increased on the image that is printed out.

As described above, during the image formation, the rotary polygon mirror 42 is rotated at a constant speed to constantly grasp the rotational position of the rotary polygon mirror 42 based on the BD signal, to thereby drive the light source 17 in synchronization with the BD signal. Even when the rotary polygon mirror 42 is formed in the non-regular polygonal shape to provide a difference in BD signal period, the BD signal is a reference of the entire drive control of the light source 17 in one scanning. A time period from the BD signal output to the image writing start and a time period from the BD signal output to the image writing end do not differ among the reflection surfaces 1, 2, 3, and 4 of the rotary polygon mirror 42. This reason will be described below with reference to FIGS. 6A and 6B.

Figure 6A:
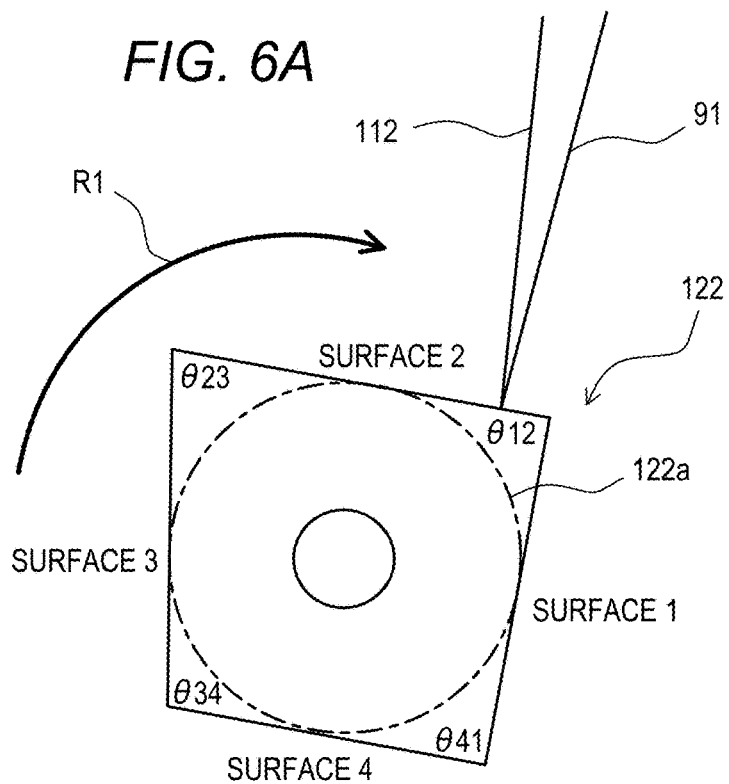
FIGS. 6A and 6B are views for illustrating an incident optical path and a BD optical path.
Figure 6B:
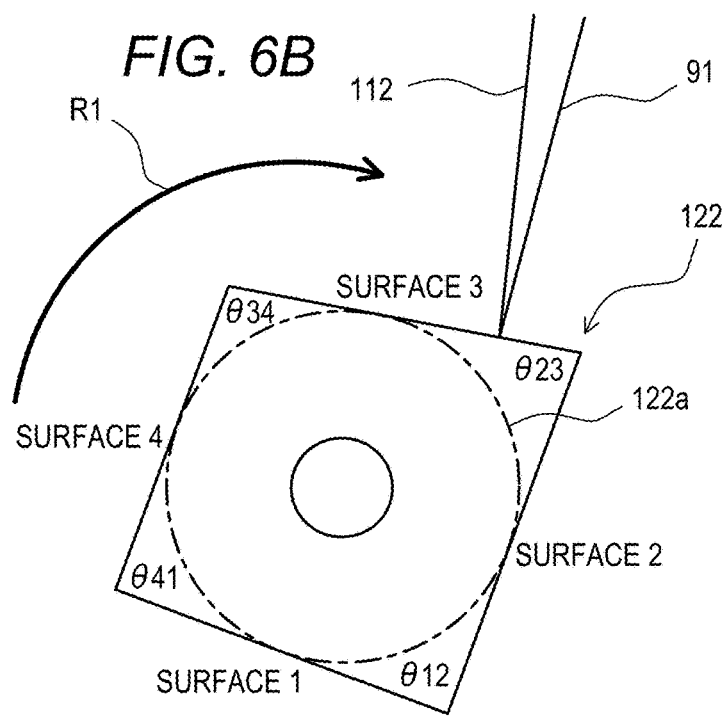

FIGS. 6A and 6B are views for illustrating an incident optical path 112 and a BD optical path 91. FIGS. 6A and 6B are illustrations of the incident optical path 112 of the light beam entering a rotary four-sided polygon mirror 122 in which a difference is provided between the first interior angle θ23 and the second interior angle θ34 which are adjacent to each other, and the BD optical path 91 of the light beam traveling from the reflection surface toward the BD 97. In FIG. 6A, the light beam is reflected by the reflection surface 2. In FIG. 6B, the light beam is reflected by the next reflection surface 3 of the rotary polygon mirror 122 rotated in the rotational direction R1. The rotary four-sided polygon mirror 122 illustrated in FIGS. 6A and 6B has an inscribed circle 122a in contact with the reflection surfaces 1, 2, 3, and 4. In general, when the rotary four-sided polygon mirror has a square shape, the light beam is reflected to the BD optical path 91 for each 90° (=360°/4) rotation of the rotary four-sided polygon mirror.

Meanwhile, in the case of the rotary four-sided polygon mirror 122 in which a difference is provided between the adjacent interior angles as illustrated in FIGS. 6A and 6B, although there is a difference in that the rotary four-sided polygon mirror 122 is rotated in a larger angle or in a smaller angle, the reflecting point and the BD optical path 91 are theoretically the same among the reflection surfaces 1 to 4. Further, the time period (rotation angle) from the reflection of the light beam to the BD optical path 91 until the image writing start, the time period (rotation angle) until the image writing end, the reflecting point at the image writing start, and the reflecting point at the image writing end are all the same. That is, even when the rotary polygon mirror 42 is formed in a non-regular polygonal shape, as long as the non-regular polygonal shape has an inscribed circle, there is theoretically no disadvantage in terms of image forming timing in the main-scanning direction Y, which is entirely based on the BD signal.

On the other hand, when an image is formed on the photosensitive member 50, which is rotating at a constant speed in the sub-scanning direction (rotational direction of the photosensitive member 50) perpendicular to the main-scanning direction Y, based on the BD signal output at different BD signal periods (intervals), the image writing start interval varies depending on each of the reflection surfaces 1 to 4 of the rotary polygon mirror 42. Therefore, the scanning line interval, which originally appears as an equal interval in the sub-scanning direction, varies. That is, even when the rotary polygon mirror 42 rotates at a constant speed, the BD signal period differs, and hence there is apparently generated a jitter component of one revolution period. With this, image defects such as color misalignment and moire may be caused.

In general, in order to prevent such image defects, the jitter component in one revolution period of the motor 41 is suppressed to about 0.010% or less. In contrast, for example, when a difference of 0.05° is provided between the first interior angle θ23 and the second interior angle θ34 which are adjacent to each other of the rotary four-sided polygon mirror, a jitter component of 0.055% (=0.05/90) is generated. This means that the jitter component takes an unignorable value depending on the magnitude of the difference in BD signal period, which is forcibly provided by forming the rotary polygon mirror 42 into a non-regular polygonal shape.

As described above, merely providing a difference between the first interior angle θ23 and the second interior angle θ34 which are adjacent to each other in order to identify the reflection surfaces 1 to 4 of the rotating rotary polygon mirror 42 may cause (2 surfaces)×(2 periods) due to the manufacturing error or the like. As a result, it is necessary to increase the tolerance against the manufacturing error by increasing the interior angle difference or significantly shifting the design nominal interior angle (nominal value) from the reference value of 90°. However, when the interior angle difference is increased or the nominal interior angle is significantly shifted from the reference value α, image defects in the sub-scanning direction may be caused.

Next, the shape of the rotary polygon mirror 42 according to the embodiment, which is designed to identify the reflection surfaces 1 to 4 of the rotating rotary polygon mirror 42, will be described. As described above, even when a difference is provided between the first interior angle θ23 and the second interior angle θ34 which are adjacent to each other, the same periodicity may appear for every two surfaces as shown in FIG. 5B. Therefore, it has been necessary to increase the difference between the first interior angle θ23 and the second interior angle θ34 which are adjacent to each other so as to reliably prevent occurrence of the same periodicity for every two surfaces even when the manufacturing error occurs. Paradoxically, in order to reliably identify the reflection surfaces 1 to 4 of the rotating rotary polygon mirror 42, the possibility of occurrence of the periodicity during one revolution of the rotary polygon mirror 42 may be reliably prevented.

When different BD signal periods are obtained in the rotary four-sided polygon mirror formed in a non-regular four-sided polygon, the only pattern that creates the periodicity is (2 surfaces)×(2 periods) based on 2, which is a divisor of 4 corresponding to the number of corners of the rotary four-sided polygon mirror. In the case of (2 surfaces)×(2 periods), two equal patterns are generated in the BD signal period during one revolution of the rotary four-sided polygon mirror 121. In order to prevent the two equal patterns from appearing in the BD signal period during one revolution of the rotary four-sided polygon mirror 121, the possibility of attaining the following relationship:

$T12=T34$ or $T23=T41$, as shown in FIG. 5B may be reliably prevented. Therefore, in the case of the rotary four-sided polygon mirror 121, instead of providing a difference between the first interior angle θ23 and the second interior angle θ34 which are adjacent to each other, it is preferred to provide a difference between the first interior angle θ23 and the third interior angle θ41 which are opposed to each other, or between the second interior angle θ34 and the fourth interior angle θ12 which are opposed to each other.

Figure 1A:
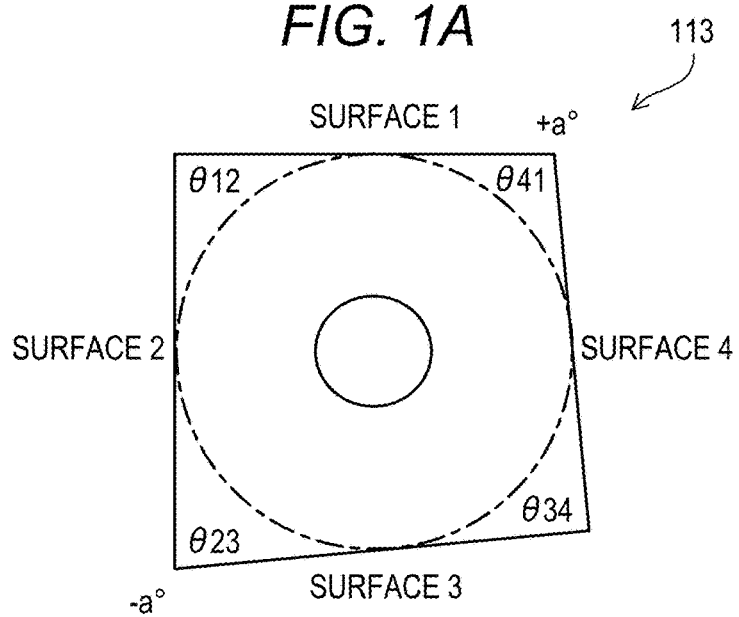
FIGS. 1A and 1B are plan views for illustrating a rotary four-sided polygon mirror in which a difference is provided between a first interior angle and a third interior angle which are opposed to each other according to a first embodiment.
Figure 1B:
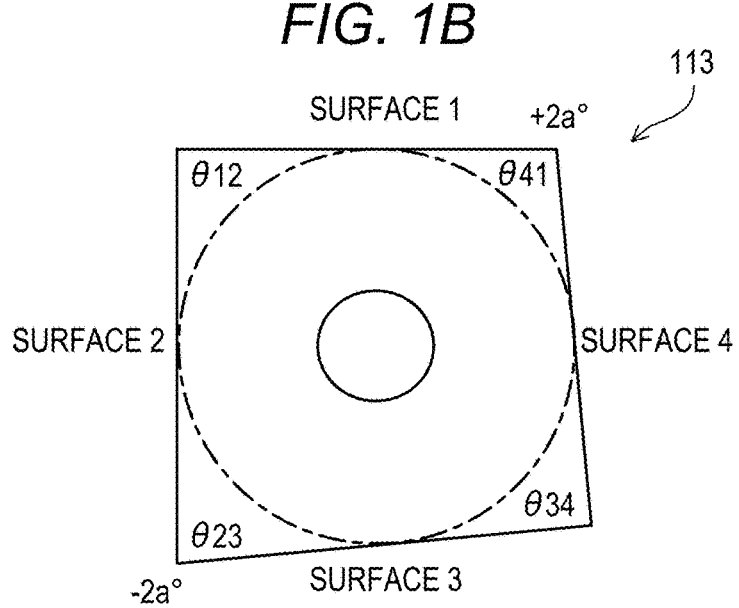

This shape is illustrated in FIGS. 1A and 1B. FIGS. 1A and 1B are plan views of a rotary four-sided polygon mirror 113 in which a difference is provided between the first interior angle θ23 and the third interior angle θ41 which are opposed to each other according to the first embodiment. The rotary four-sided polygon mirror 113 is formed in a four-sided polygon having four reflection surfaces defined as four sides thereof. The reference value α of the interior angle of the rotary four-sided polygon mirror 113 is 90°, which is obtained by dividing 360° corresponding to the sum of the interior angles by 4 corresponding to the number of corners. The range of the manufacturing error is set to ±a°. Symbol "a" represents a permissible value. In this case, the design interior angle value is referred to as a nominal value (nominal interior angle). In FIG. 1A, the nominal value of the first interior angle θ23 is 90°−a°. The nominal value of the third interior angle θ41 is 90°+a°. The nominal value of the second interior angle θ34 and the nominal value of the fourth interior angle θ12 are each 90°. In FIG. 1A, the reference value of 90° is omitted, and only ±a° is represented. The difference between the first interior angle θ23 and the third interior angle θ41 which are opposed to each other of the rotary four-sided polygon mirror 113 illustrated in FIG. 1A is 2a°.

In FIG. 1B, the nominal value of the first interior angle θ23 is 90°−2a°. The nominal value of the third interior angle θ41 is 90°+2a°. The nominal value of the second interior angle θ34 and the nominal value of the fourth interior angle θ12 are each 90°. In FIG. 1B, the reference value of 90° is omitted, and only ±2a° is represented. The difference between the first interior angle θ23 and the third interior angle θ41 which are opposed to each other of the rotary four-sided polygon mirror 113 illustrated in FIG. 1B is 4a°.

In the following, the rotary four-sided polygon mirror 113 illustrated in FIGS. 1A and 1B is referred to as "deformed rotary polygon mirror 113". First, the deformed rotary polygon mirror 113 illustrated in FIG. 1B will be described through comparison with a rotary four-sided polygon mirror 114 of a comparative example illustrated in FIG. 7. The nominal values of the fourth interior angle θ12 and the second interior angle θ34 which are opposed to each other of the deformed rotary polygon mirror 113 illustrated in FIG. 1B are each 90°, which is the same as the reference value α of the interior angle of the normal rotary polygon mirror formed in a regular four-sided polygon. Then, the first interior angle θ23 and the third interior angle θ41 which are opposed to each other have nominal values which are different by 2a° from the reference value of 90°. In this case, the first interior angle θ23 is an acute angle, and the fourth interior angle θ41 is an obtuse angle. Therefore, the following relationship is obtained.

First interior angle θ23=90°−2a°

Third interior angle θ41=90°+2a°

Note that, the rotary polygon mirror illustrated in FIG. 1A is formed in a four-sided polygon having four corner portions formed by the sides defining the four reflection surfaces. Alternatively, as an embodiment of the rotary polygon mirror, the four corner portions may be subjected to chamfering processing (curved surface processing). In such a rotary polygon mirror, four interior angles of a virtual four-sided polygon defined by the four reflection surfaces in the rotary polygon mirror correspond to the first interior angle θ23, the second interior angle θ34, the third interior angle θ41, and the fourth interior angle θ12.

Figure 7:
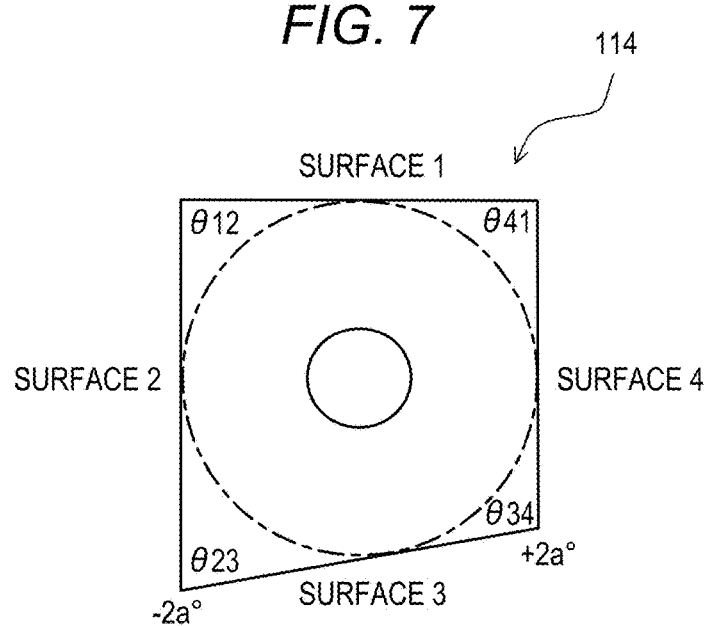
FIG. 7 is a plan view of a rotary four-sided polygon mirror in which a difference is provided between a first interior angle and a fourth interior angle which are adjacent to each other according to a comparative example.

FIG. 7 is a plan view of the rotary four-sided polygon mirror 114 in which a difference is provided between the first interior angle θ23 and the second interior angle θ34 which are adjacent to each other according to the comparative example. In the following, the rotary four-sided polygon mirror 114 illustrated in FIG. 7 is referred to as "trapezoid rotary polygon mirror 114". The nominal values of the third interior angle θ12 and the fourth interior angle θ41 which are adjacent to each other of the trapezoid rotary polygon mirror 114 of FIG. 7 are each 90°, which is the same as the reference value α of the interior angle of the normal rotary polygon mirror formed in a regular four-sided polygon. Further, the first interior angle θ23 and the second interior angle θ34 which are adjacent to each other have nominal values different by 2a° from the reference value of 90° similarly to the deformed rotary polygon mirror 113. In this case, the first interior angle θ23 is an acute angle, and the second interior angle θ34 is an obtuse angle. Therefore, the following relationship is obtained.

First interior angle θ23=90°−2a°

Second interior angle θ34=90°+2a°

Figure 8A:
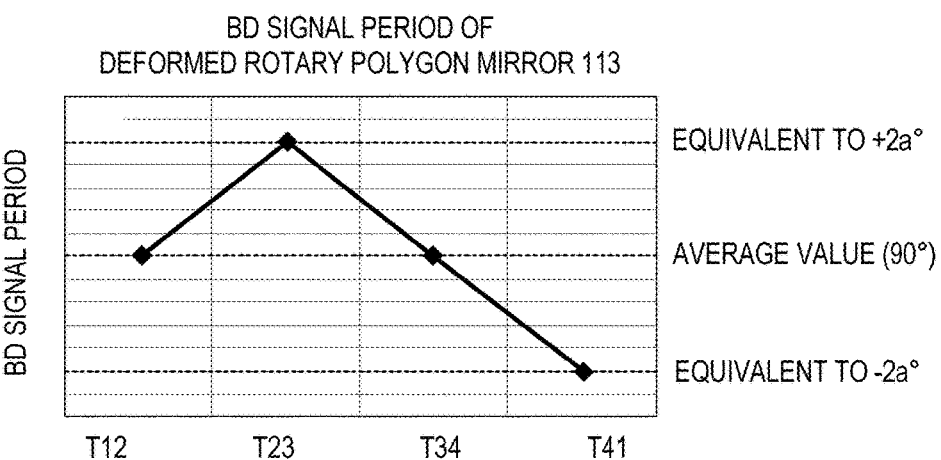
FIG. 8A is a graph for showing a BD signal period of a deformed rotary polygon mirror.
Figure 8B:
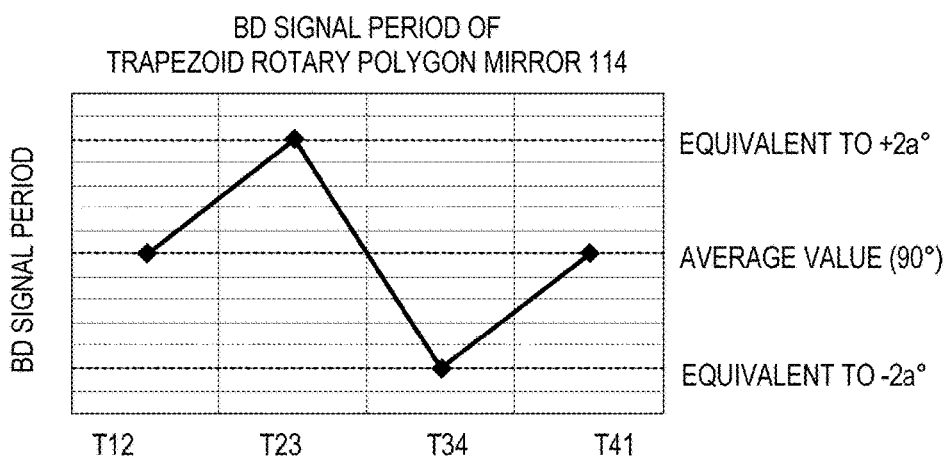
FIG. 8B is a graph for showing a BD signal period of a trapezoid rotary polygon mirror.

FIGS. 8A and 8B are graphs for showing the BD signal periods of the deformed rotary polygon mirror 113 and the trapezoid rotary polygon mirror 114. FIG. 8A is a graph for showing the nominal BD signal period of the deformed rotary polygon mirror 113. FIG. 8B is a graph for showing the nominal BD signal period of the trapezoid rotary polygon mirror 114. FIGS. 8A and 8B represent the BD signal periods by a time T12, a time T23, a time T34, and a time T41. The BD signal period shown in each of FIGS. 8A and 8B is a design nominal value. However, the BD signal period may be a value of one revolution of the deformed rotary polygon mirror 113 or the trapezoid rotary polygon mirror 114, or may be an average value of several rotations. Further, the sum of the interior angles of the deformed rotary polygon mirror 113 or the trapezoid rotary polygon mirror 114 is 360°. The deformed rotary polygon mirror 113 and the trapezoid rotary polygon mirror 114 are each formed in a four-sided polygon, and hence the average value of the BD signal period is equivalent to 90° (=360°/4) regardless of the position of the interior angle provided with the difference.

Referring to FIG. 8A, the second interior angle θ34 and the fourth interior angle θ12 of the deformed rotary polygon mirror 113 each have the reference value of 90° and the nominal value. Therefore, the time T34 and the time T12 in the BD signal period each take an average value equivalent to the reference value of 90°. On the other hand, the first interior angle θ23 and the third interior angle θ41 which are opposed to each other of the deformed rotary polygon mirror 113 have nominal values obtained by providing differences of ±2a° to the reference value 90°. Therefore, the time T23 and the time T41 in the BD signal period are plotted at positions significantly shifted from the average value in a form of being sandwiched between the time T12 and the time T34 taking the average value. When being subjected to angle conversion, those deviation amounts are equivalent to the amounts of ±2a° by which the first interior angle θ23 and the third interior angle θ41 are shifted from the reference value of 90°.

In contrast, referring to FIG. 8B, the first interior angle θ23 and the second interior angle θ34 which are adjacent to each other of the trapezoid rotary polygon mirror 114 have nominal values obtained by providing differences of ±2a° to the reference value of 90°. Therefore, the time T23 and the time T34 which are adjacent to each other in the BD signal period are plotted at positions sequentially significantly shifted from the average value. In sequence thereto, the time T41 and the time T12 at which the BD signal period is generated at normal 90° rotation of the trapezoid rotary polygon mirror 114 appear. When similarly being subjected to angle conversion, the deviation amounts of the time T23 and the time T34 which are adjacent to each other are equivalent to the amounts of ±2a° by which the first interior angle θ23 and the second interior angle θ34 are shifted from the reference value of 90°.

Next, the manufacturing error tolerance of each of the deformed rotary polygon mirror 113 and the trapezoid rotary polygon mirror 114 will be described. Note that, the manufacturing error tolerance represents a tolerance until the reflection surface identification is failed when the above-mentioned manufacturing error ±a° occurs in the direction of reducing the difference in BD signal period. That is, when the difference in BD signal period cannot be detected unless a larger interior angle difference is provided to the interior angles of the rotary polygon mirror, it means that the manufacturing error tolerance is low.

In the embodiment, the difference to be caused in the BD signal period when the manufacturing error of ±a° with respect to the nominal value occurs in the interior angles of the actually manufactured deformed rotary polygon mirror 113 and trapezoid rotary polygon mirror 114 is represented by "equivalent to ±a°". For example, the nominal value of the interior angle of the normal rotary polygon mirror formed in a regular four-sided polygon is the reference value of 90°, and when the manufacturing error of ±a° occurs to the interior angle nominal value of 90°, the BD signal period is subjected to angle conversion to be represented by "equivalent to 90°±a°". That is, the difference in BD signal period to be caused by the manufacturing error of ±a° is represented by "equivalent to ±a°".

In comparison of the manufacturing error tolerance between the deformed rotary polygon mirror 113 and the trapezoid rotary polygon mirror 114, it is assumed that the interior angles are formed in the direction of causing difficulty in identification of the reflection surface due to the manufacturing error of ±a°. That is, it is assumed that the interior angles are formed so that the difference caused in the BD signal period is most reduced due to the manufacturing error of ±a°.

Figure 9A:
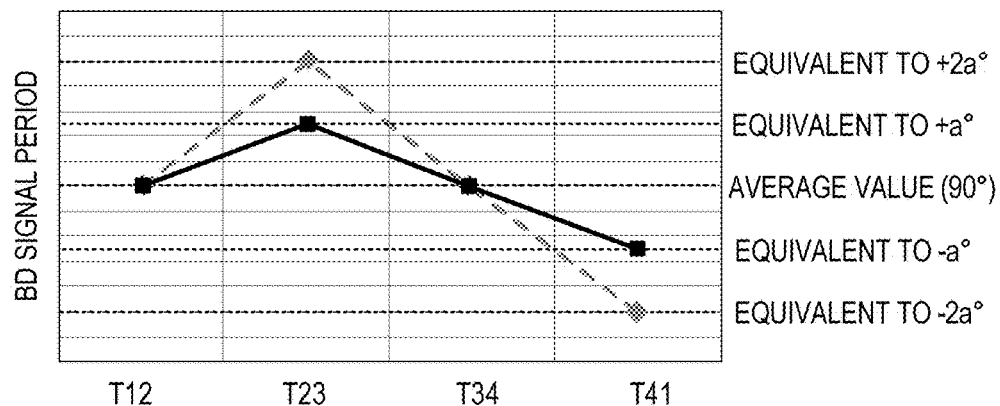
FIGS. 9A and 9B are graphs for showing a state in which the difference in BD signal period is reduced due to a manufacturing error.
Figure 9B:
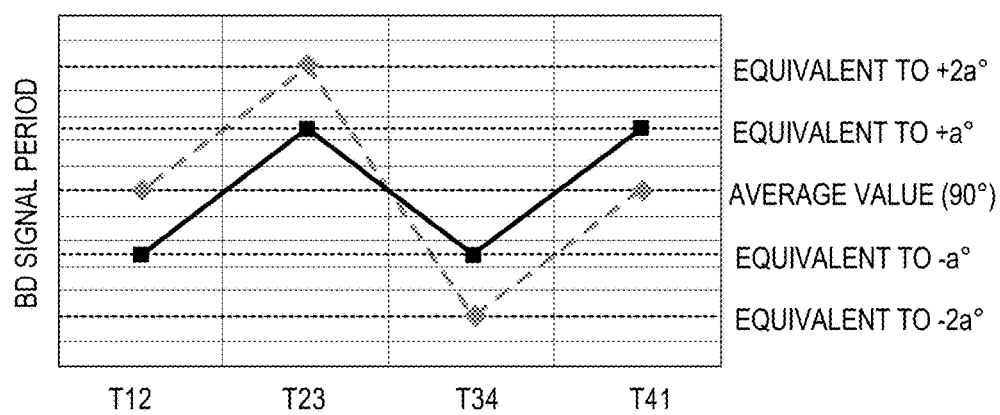

FIGS. 9A and 9B are graphs for showing a state in which the difference in BD signal period is reduced due to the manufacturing error of ±a°. FIG. 9A is a graph for showing the manufacturing error tolerance of the deformed rotary polygon mirror 113. FIG. 9B is a graph for showing the manufacturing error tolerance of the trapezoid rotary polygon mirror 114. In the case of the deformed rotary polygon mirror 113, when the BD signal period as shown in FIG. 8A is changed to the BD signal period as shown in FIG. 9A, the difference in BD signal period between the time T23 and the time T41 is most reduced.

Specifically,
Time T12=equivalent to 90°
Time T23=equivalent to 90°+2a°
Time T34=equivalent to 90°
Time T41=equivalent to 90°−2a°
are changed as follows.
Time T12=equivalent to 90°
Time T23=equivalent to 90°+a°
Time T34=equivalent to 90°
Time T41=equivalent to 90°−a°

In FIG. 9A, the dotted line represents the nominal BD signal period of the deformed rotary polygon mirror 113, and the solid line represents the BD signal period with a deviation equivalent to ±a° due to the manufacturing error of ±a°.

Based on FIG. 9A, it is understood that, although there is a period difference equivalent to 4a° between the time T23 and the time T41 in the nominal BD signal period of the deformed rotary polygon mirror 113 having different opposed interior angles, the period difference is reduced to be equivalent to 2a° when the manufacturing error occurs. However, the BD signal period is prevented from having the same periodicity for every two surfaces ((2 surfaces)×(2 periods)), which inhibits identification of the reflection surfaces 1 to 4 of the deformed rotary polygon mirror 113. In the state shown in FIG. 9A, the identification of the reflection surface is still possible.

Similarly, in the case of the trapezoid rotary polygon mirror 114, when the BD signal period as shown in FIG. 8B is changed to the BD signal period as shown in FIG. 9B, the difference in BD signal period between the time T23 and the time T34 is most reduced.

Specifically,
Time T12=equivalent to 90°

Time T23=equivalent to 90°+2a°
Time T34=equivalent to 90°−2a°
Time T41=equivalent to 90°
are changed as follows.
Time T12=equivalent to 90°−a°
Time T23=equivalent to 90°+a°
Time T34=equivalent to 90°−a°
Time T41=equivalent to 90°+a°

In FIG. 9B, the dotted line represents the nominal BD signal period of the trapezoid rotary polygon mirror 114, and the solid line represents the BD signal period with a deviation equivalent to ±a° due to the manufacturing error of ±a°.

Based on FIG. 9B, it is understood that, although there is a period difference equivalent to 4a° between the time T23 and the time T34 in the nominal BD signal period of the trapezoid rotary polygon mirror 114 having different adjacent interior angles, there occurs (2 surfaces)×(2 periods) when the manufacturing error occurs, which inhibits identification of the reflection surface. In other words, the condition of the limit at which the identification of the reflection surface of the trapezoid rotary polygon mirror 114 is failed during rotation resides in that a period difference equivalent to 4a° or more does not appear between the time T23 and the time T34 in the nominal BD signal period. In the trapezoid rotary polygon mirror 114, it is necessary to provide, to the adjacent interior angles, a difference of at least twice)(±2a° of the deviation equivalent to ±a° caused in the BD signal period due to the manufacturing error of ±a°, that is, a difference larger than 4a°.

In the trapezoid rotary polygon mirror 114, the BD signal period of (2 surfaces)×(2 periods), which inhibits the identification of the reflection surface as shown in FIG. 9B, is established only after the manufacturing error of ±a° occurs at all the times T12, T23, T34, and T41. However, when mass production is assumed, it can be said that the trapezoid rotary polygon mirror 114 with a possibility to have (2 surfaces)×(2 periods) in principle and the deformed rotary polygon mirror 113 without a possibility to have (2 surfaces)×(2 periods) in principle are significantly different from each other in consideration of reliability.

Figure 10:
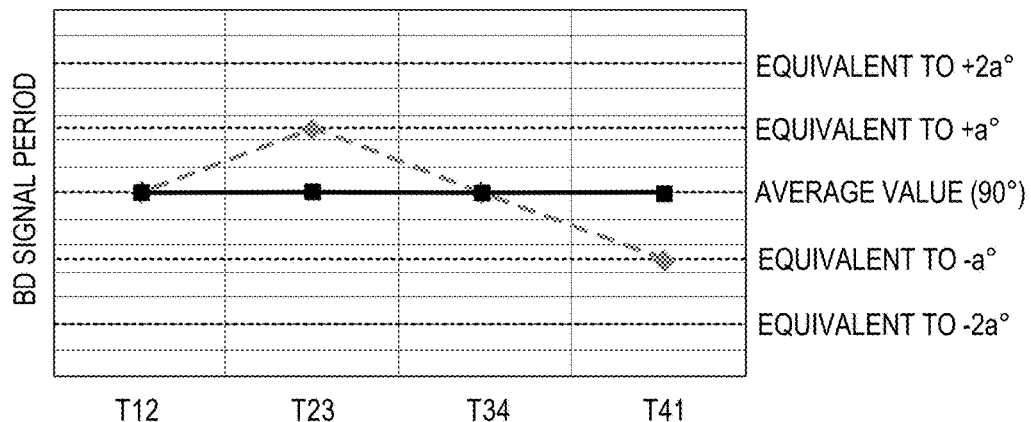
FIG. 10 is a graph for showing a reflection surface identifying limit of the deformed rotary polygon mirror according to the first embodiment.

Next, referring to FIG. 10, the case of the same manufacturing error tolerance as the trapezoid rotary polygon mirror 114, that is, the condition of the limit at which identification of the reflection surface of the rotating deformed rotary polygon mirror 113 is failed will be described. FIG. 10 is a graph for showing the reflection surface identifying limit of the deformed rotary polygon mirror 113 according to the first embodiment. In the case of the deformed rotary polygon mirror 113, when the nominal BD signal period indicated by the dotted line of FIG. 10 is changed to the BD signal period indicated by the solid line, which has a deviation equivalent to ±a° due to the manufacturing error of ±a°, the reflection surface of the deformed rotary polygon mirror 113 cannot be identified.

Specifically,
Time T12=equivalent to 90°
Time T23=equivalent to 90°+a°
Time T34=equivalent to 90°
Time T41=equivalent to 90°−a°
are changed as follows.
Time T12=equivalent to 90°
Time T23=equivalent to 90°
Time T34=equivalent to 90°
Time T41=equivalent to 90°

That is, the condition of the limit at which the identification of the reflection surface of the rotating deformed rotary polygon mirror 113 is failed resides in that a period difference equal to or more than the deviation equivalent to ±a° caused by the manufacturing error of ±a° does not appear between the time T23 and the time T41 in the nominal BD signal period. That is, when a difference larger than 2a° is provided to the opposed interior angles, the reflection surface of the rotating deformed rotary polygon mirror 113 can be identified regardless of the manufacturing error of ±a°. The difference necessary for the opposed interior angles of the deformed rotary polygon mirror 113 (difference larger than) 2a° is equivalent to ½ of the difference necessary for the adjacent interior angles of the trapezoid rotary polygon mirror 114 (difference larger than 4a°).

As described above, when the interior angle difference or the angle deviation from the reference value is taken large, image defects may be caused in the sub-scanning direction even if there are no disadvantages of image defects in the main-scanning direction. Therefore, it is preferred that the interior angle difference or the angle deviation from the reference value not be provided as much as possible in terms of image quality. Therefore, the deformed rotary polygon mirror 113 has a larger tolerance against a manufacturing error as compared to the trapezoid rotary polygon mirror 114, and hence has a configuration capable of identifying the reflection surface while reducing the interior angle difference or the angle deviation from the reference value as much as possible.

In this case, there are factors that cause the difference in BD signal period other than such a surface division error accuracy that the interior angles of the rotary polygon mirror 42 are respectively different angles. It has been already described that an eccentric accuracy in each of the reflection surfaces 1 to 4 of the rotary polygon mirror 42 with respect to the rotation shaft 101, a quantization error due to the resolution of the image forming apparatus 100 configured to detect the BD signal, and a surface accuracy difference of the rotary polygon mirror 42 are also factors that cause the difference in BD signal period. Among them, the particularly dominant factor is the surface division error accuracy that the interior angles of the rotary polygon mirror 42 are respectively different angles.

The surface division error is an error in positioning accuracy of a processing machine used when the reflection surfaces 1 to 4 of the rotary polygon mirror 42 are subjected to mirror finishing. Specifically, in the case of the rotary four-sided polygon mirror, after a certain reflection surface is subjected to mirror finishing, the rotary four-sided polygon mirror is rotated by 90° in order to process the next reflection surface. The surface division error refers to an error of a rotation angle. The rotation angle is generally determined with use of a rotary encoder or the like. The rotation angle accuracy of the rotary encoder depends on the resolution of the motor rotation angle per pulse. Therefore, increasing the resolution of the rotary encoder enables improvement in accuracy of the angle determination itself.

However, when the rotary polygon mirror 42 is subjected to mirror finishing, a large vibration is transmitted to the processing machine side due to a bite used in the processing. Therefore, angle determination by the rotary encoder is not enough to perform satisfactory mirror finishing because the angle is deviated due to the vibration. Therefore, after the angle determination, a step of locking the processing machine side is necessary to prevent deviation of the angle, but a slight angle deviation occurs even at this time. In other words, merely improving the resolution of the rotary encoder has a limit in increasing the accuracy of the surface division error.

Figure 11:
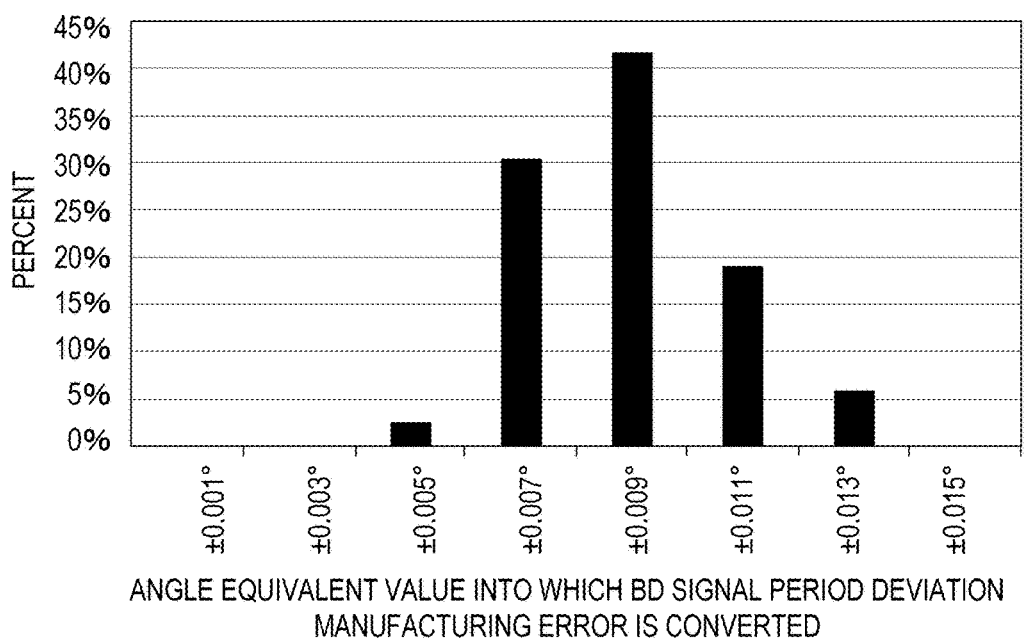
FIG. 11 is a histogram of an angle equivalent value into which a BD signal period deviation manufacturing error is converted.

In general, even when the resolution of the rotary encoder is increased, the angle equivalent value ±a° of the BD signal period deviation manufacturing error obtained by adding the other factors that cause the difference in BD signal period described above has a mass production limit of about ±0.015° (less than ±1 minute) when being expressed as an actual angle. FIG. 11 is a histogram of an angle equivalent value into which the BD signal period deviation manufacturing error is converted. FIG. 11 is a histogram of a case where an available high-accuracy rotary encoder is used, and represents that the mass production limit is substantially about ±0.015°.

In this case, in order to reduce the disadvantages on the image when the reflection surface is identified by the difference in BD signal period, it is desired to provide a minimum interior angle difference to the rotary polygon mirror having as high divisional error accuracy as possible. This is because the use of the divisional error accuracy of the high-accuracy rotary polygon mirror can suppress the disadvantages leading to image deterioration caused by intentionally providing the interior angle difference to the rotary polygon mirror.

As a result of the above, the angle equivalent value ±a° into which the BD signal period deviation manufacturing error, which is required to be assumed in the rotary polygon mirror having a high divisional error accuracy, is converted is ±0.015° at the minimum. Therefore, the specific nominal values of the interior angles of the deformed rotary polygon mirror 113 according to the first embodiment illustrated in FIG. 1A are as follows.

First interior angle θ23=value smaller than 90°−0.015°

Second interior angle θ34=90°

Third interior angle θ41=value larger than 90°+0.015°

Fourth interior angle θ12=90°

The difference between the first interior angle θ23 and the third interior angle θ41 which are opposed to each other of the deformed rotary polygon mirror 113 is a value larger than 0.03°.

On the other hand, as described above, the interior angle difference and the angle deviation from the reference value are preferred to be as small as possible in terms of image quality, and hence the fourth interior angle θ12 and the second interior angle θ34 are preferred to have the nominal value being the reference value of 90°. Therefore, the difference of the other pair of the fourth interior angle θ12 and the second interior angle θ34 which are opposed to each other is inevitably 0.03° or less. In other words, in the deformed rotary polygon mirror 113, the difference of the pair of diametrically opposed interior angles is larger than 0.03°, and the difference of another pair of diametrically opposed interior angles is 0.03° or less.

The image forming apparatus 100 includes a processing device configured to determine the BD signal period based on the BD signal from the BD 97, to thereby identify the reflection surface of the rotary polygon mirror based on the difference in BD signal period (BD signal interval). The processing device may be configured so that, based on the BD signal generated during acrivation of the light scanning apparatus 40, identification of the plurality of reflection surfaces of the rotary polygon mirror is completed during the activation of the light scanning apparatus 40. With this configuration, even during the acceleration of the motor 41, the reflection surface of the rotating rotary polygon mirror can be identified based on the difference in BD signal period. With this, the image forming process can be accelerated, to thereby increase the speed until the product is delivered.

According to the embodiment, in the rotary polygon mirror having different interior angles, the image defects can be prevented, and the identification of the reflection surface can be facilitated regardless of the manufacturing error.

Second Embodiment

In the first embodiment, the rotary four-sided polygon mirror 113 is described as an example of the rotary polygon mirror 42. But in a second embodiment, a rotary six-sided polygon mirror will be described as an example of the rotary polygon mirror 42. In the second embodiment, the structure similar to that in the first embodiment is denoted by the same reference symbol, and description thereof is omitted herein. The image forming apparatus 100 and the light scanning apparatus 40 of the second embodiment are similar to those in the first embodiment, and hence description thereof is omitted herein. As described in the first embodiment, when the rotary four-sided polygon mirror is formed in a non-regular four-sided polygon to cause a difference in BD signal period, the only pattern that creates the periodicity is (2 surfaces)×(2 periods). Further, the configuration for reliably avoiding the possibility to cause (2 surfaces)×(2 periods) has a strong tolerance against a manufacturing error without providing the interior angle difference or the angle deviation from the reference value as much as possible, and is capable of reliably identifying the reflection surface.

Figure 12A:
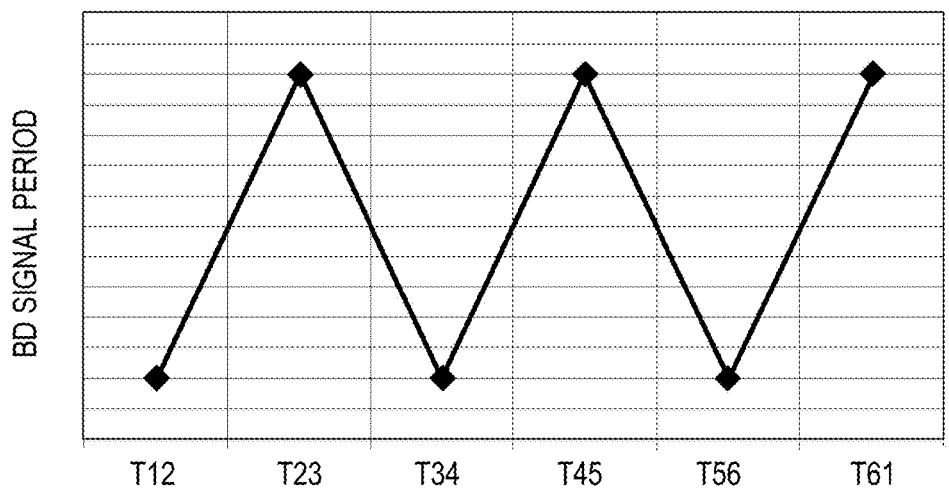
FIGS. 12A and 12B are graphs for showing examples of a repetitive pattern caused in a BD signal period of a rotary six-sided polygon mirror.
Figure 12B:
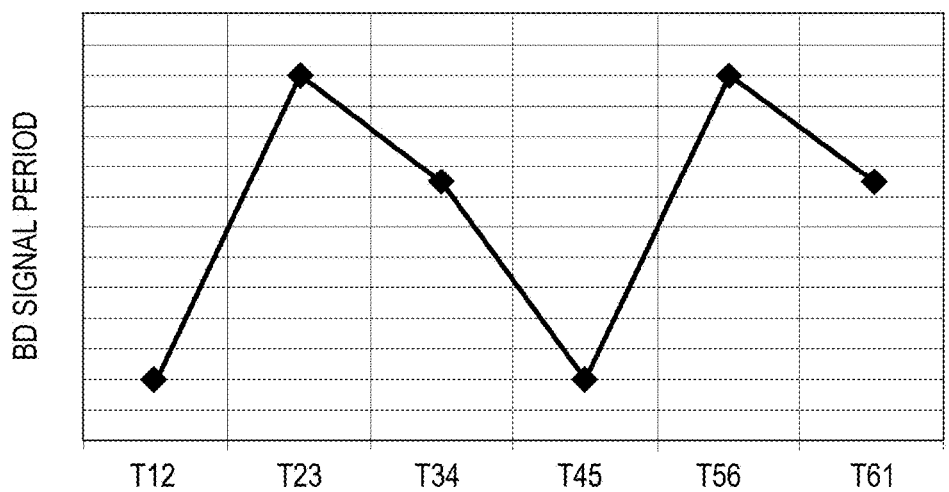

On the other hand, in the case of the rotary six-sided polygon mirror, there are patterns of (2 surfaces)×(3 periods) and (3 surfaces)×(2 periods), which correspond to divisors 2 and 3 of 6 corresponding to the number of corners of the rotary six-sided polygon mirror. In order to obtain the configuration capable of reliably identifying the reflection surface, it is necessary to reliably eliminate the possibility of causing (2 surfaces)×(3 periods) and (3 surfaces)×(2 periods). FIGS. 12A and 12B are graphs for showing examples of a repetitive pattern generated in the BD signal period of the rotary six-sided polygon mirror. FIG. 12A is a graph for showing the repetitive pattern of (2 surfaces)×(3 periods) to be caused in the BD signal period per revolution of the rotary six-sided polygon mirror. The same pattern successively occurs for every two surfaces of the rotary six-sided polygon mirror. FIG. 12B is a graph for showing the repetitive pattern of (3 surfaces)×(2 periods) to be caused in the BD signal period per revolution of the rotary six-sided polygon mirror. The same pattern successively occurs for every three surfaces of the rotary six-sided polygon mirror. In such cases, the image forming apparatus 100 cannot identify the reflection surface of the rotating rotary six-sided polygon mirror.

Figure 13:
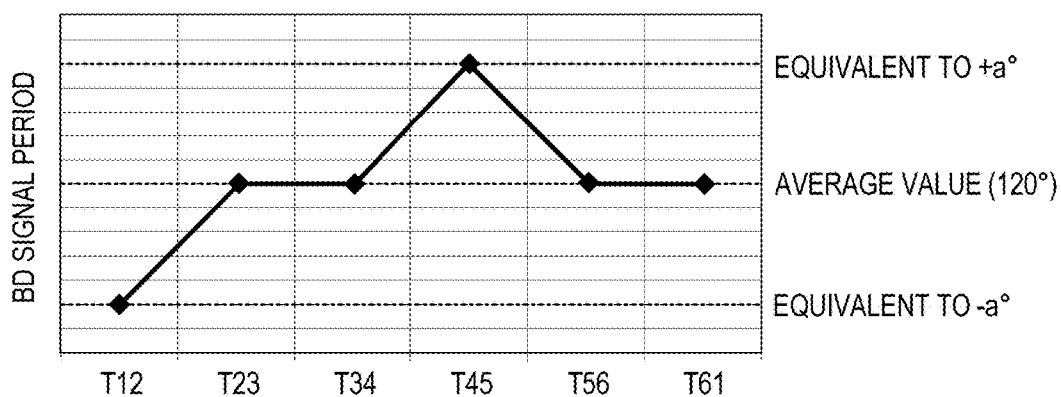
FIG. 13 is a graph for showing a BD signal period of the rotary six-sided polygon mirror in which a difference is provided between a first interior angle and a fourth interior angle.

In order to prevent occurrence of (3 surfaces)×(2 periods), it is necessary to establish such a relationship that the BD signal period is different among at least four surfaces corresponding to 4, which is a value larger by 1 than 3 corresponding to the second largest divisor among the divisors of 6 corresponding to the number of corners of the rotary six-sided polygon mirror. FIG. 13 is a graph for showing the BD signal period of the rotary six-sided polygon mirror in which a difference is provided between the first interior angle and the fourth interior angle.

In this case, the sum of the interior angles of the rotary six-sided polygon mirror is 720°, and hence the average value of the BD signal period is equivalent to 120° (=720°/6)

regardless of the position of the interior angle provided with the difference. Further, ±a° represents an angle equivalent value into which the BD signal period deviation manufacturing error assumed in the embodiment is converted. Under such conditions that the interior angle difference and the angle deviation from the reference value are not provided as much as possible, the condition of the limit at which the identification of the reflection surface of the rotary six-sided polygon mirror is failed is as follows.

Time T12=equivalent to 120°−a°
Time T45=equivalent to 120°+a°

Figure 14:
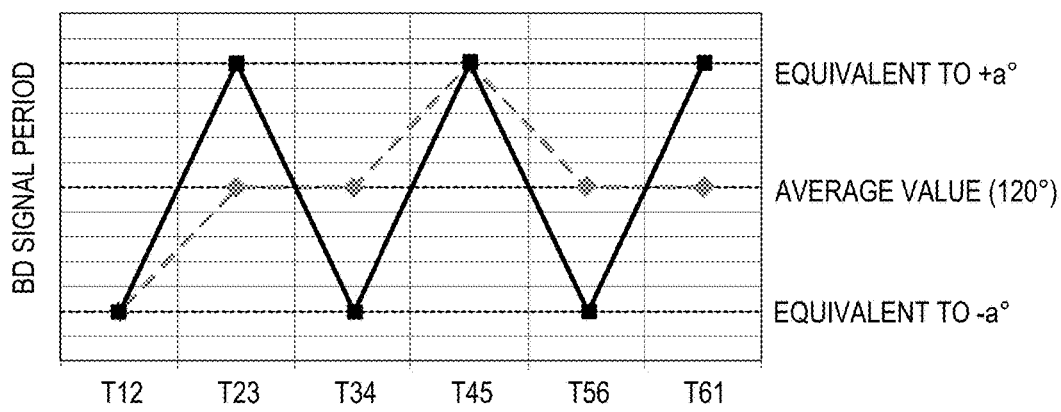
FIG. 14 is a graph for showing an example in which (2 surfaces)×(3 periods) occurs in the BD signal period shown in FIG. 13.

However, setting only a condition that the BD signal period differs among four surfaces may cause (2 surfaces)×(3 periods) due to the manufacturing error because 4 is an even number. FIG. 14 is a graph for showing an example in which (2 surfaces)×(3 periods) occurs in the BD signal period shown in FIG. 13. In FIG. 14, the dotted line represents a nominal BD signal period when a difference is provided in the BD signal period among four surfaces as shown in FIG. 13, and the solid line represents a BD signal period in which a deviation equivalent to ±a° is caused by the manufacturing error. When (2 surfaces)×(3 periods) occurs as shown in FIG. 14, the reflection surface of the rotary six-sided polygon mirror cannot be identified.

Therefore, in addition to the condition that the BD signal period differs among the four surfaces as shown in FIG. 13, a condition for preventing occurrence of (2 surfaces)×(3 periods) is further set. Under the condition that the BD signal period differs among the four surfaces as shown in FIG. 13, the factor that causes (2 surfaces)×(3 periods) is as follows.

Time T12=Time T34,
or
Time T23=Time T45

Therefore, it is only required to provide the interior angle difference to the rotary six-sided polygon mirror so that at least the deviation equivalent to ±a° due to the manufacturing error of ±a° appears between the time T12 and the time T34 or between the time T23 and the time T45. In the following, referring to FIGS. 15A, 15B, 16A, and 16B, rotary six-sided polygon mirrors 115 and 116 according to the second embodiment will be described, which satisfy the condition that the BD signal period differs among four surfaces and the condition for preventing (2 surfaces)×(3 periods). The rotary six-sided polygon mirrors 115 and 116 are each formed in a six-sided polygon having six reflection surfaces defined as six sides thereof.

Figure 15A:
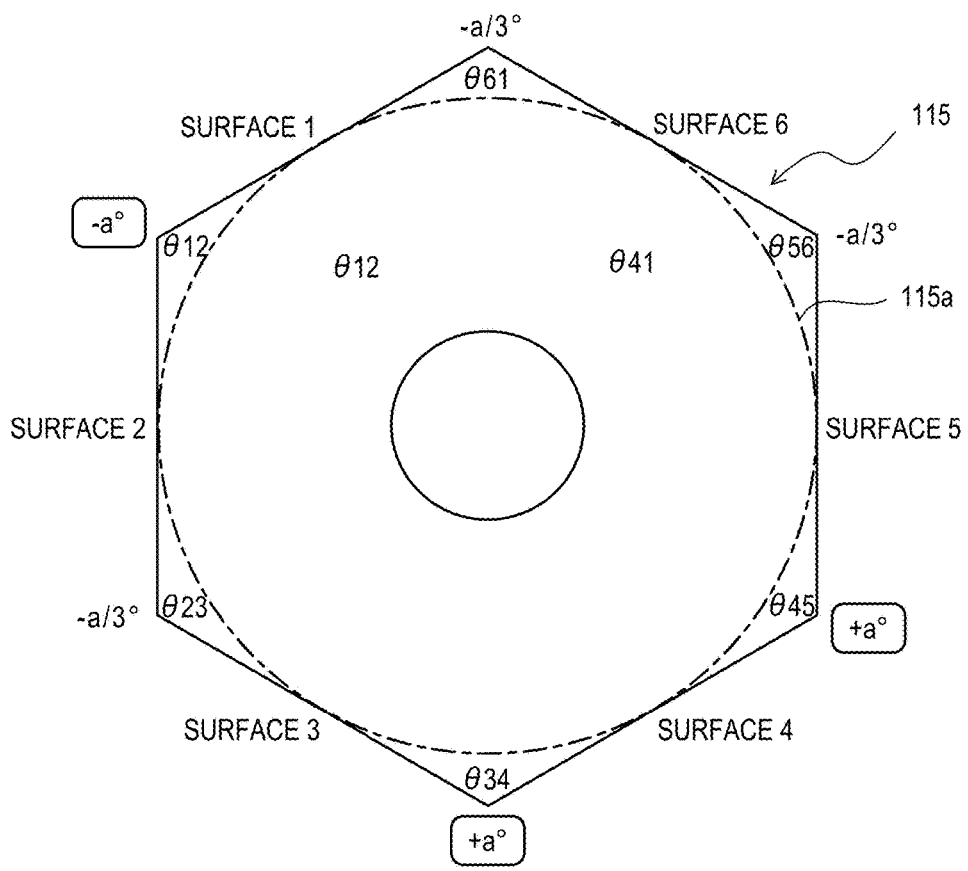
FIGS. 15A and 15B are explanatory diagrams of a rotary six-sided polygon mirror according to a second embodiment.
Figure 15B:
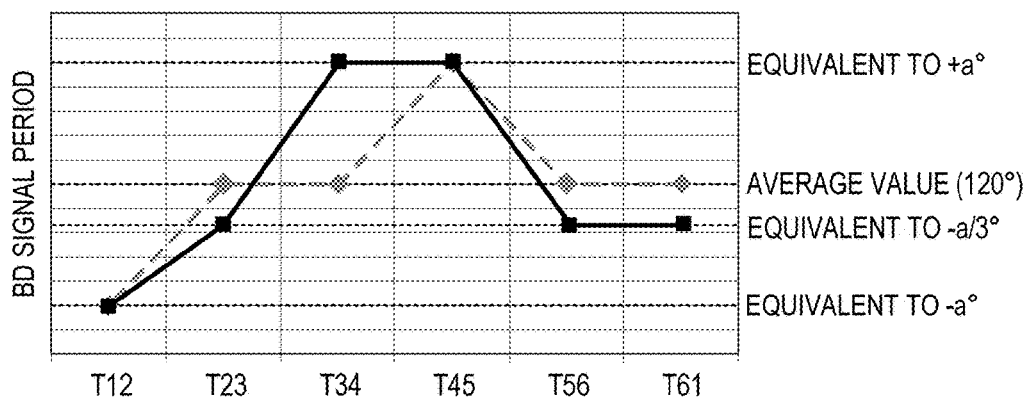

FIGS. 15A and 15B are explanatory diagrams of the rotary six-sided polygon mirror 115 according to the second embodiment. FIG. 15A is a plan view of the rotary six-sided polygon mirror 115 according to the second embodiment. FIG. 15B is a graph for showing the BD signal period of the rotary six-sided polygon mirror 115. In FIG. 15B, the dotted line represents the nominal BD signal period when a difference is provided in the BD signal period among four surfaces as shown in FIG. 13. The rotary six-sided polygon mirror 115 has, in the order of the rotation of the rotary six-sided polygon mirror 115 in the rotational direction (in a counterclockwise direction), a surface 1, a surface 2, a surface 3, a surface 4, a surface 5, and a surface 6. The interior angle formed between the surface 1 and the surface 2 is represented by a first interior angle θ12. Similarly, the interior angle formed between the surface 2 and the surface 3 is represented by a second interior angle θ23, the interior angle formed between the surface 3 and the surface 4 is represented by a third interior angle θ34, the interior angle formed between the surface 4 and the surface 5 is represented by a fourth interior angle θ45, the interior angle formed between the surface 5 and the surface 6 is represented by a fifth interior angle θ56, and the interior angle formed between the surface 6 and the surface 1 is represented by a sixth interior angle θ61. The rotary six-sided polygon mirror 115 has, in the order of the rotation in the rotational direction (in the counterclockwise direction), the first interior angle θ12, the second interior angle θ23, the third interior angle θ34, the fourth interior angle θ45, the fifth interior angle θ56, and the sixth interior angle θ61. The vertex of each interior angle may be rounded. The rotary six-sided polygon mirror 115 has an inscribed circle 115a in contact with the surfaces 1, 2, 3, 4, 5, and 6. Note that, the rotary polygon mirror illustrated in FIG. 15A is formed in a six-sided polygon having six corner portions formed by the sides defining the six reflection surfaces. Alternatively, as an embodiment of the rotary polygon mirror, the six corner portions may be subjected to chamfering processing (curved surface processing). In such a rotary polygon mirror, six interior angles of a virtual six-sided polygon defined by the six reflection surfaces in the rotary polygon mirror correspond to the first interior angle θ12, the second interior angle θ23, the third interior angle θ34, the fourth interior angle θ45, the fifth interior angle θ56, and the sixth interior angle θ61.

In the rotary six-sided polygon mirror 115, in order to eliminate the possibility of time T12=time T34, between the first interior angle θ12 and the third interior angle θ34, there is provided an interior angle difference that is larger than a permissible difference of 2a°, which is a difference between the maximum value and the minimum value of the manufacturing error of ±a°. At this time, in order to maintain 720° being the sum of the interior angles of the rotary six-sided polygon mirror 115, the second interior angle θ23, the fifth interior angle θ56, and the sixth interior angle θ61 each have a predetermined angle deviation amount of −a/3 from the reference value α. The reference value α of the interior angle of the rotary six-sided polygon mirror 115 is 120°, which is obtained by dividing 720° (=180°×(number of corners−2)) corresponding to the sum of the interior angles by 6 corresponding to the number of corners. By setting those conditions, the rotary six-sided polygon mirror 115 can eliminate the possibility of causing (2 surfaces)×(3 periods) and (3 surfaces)×(2 periods), which are derived from divisors 2 and 3 of 6 corresponding to the number of corners, even in consideration of the manufacturing error of ±a°. Therefore, the reflection surfaces 1 to 6 of the rotating rotary six-sided polygon mirror 115 can be reliably identified based on the difference in BD signal period.

In this case, in the rotary six-sided polygon mirror 115, in general, the angle equivalent value ±a° into which the BD signal period deviation manufacturing error assumed as described above is converted is equivalent to about ±0.015° when being represented by an actual angle. Therefore, the specific nominal values of the interior angles of the rotary six-sided polygon mirror (deformed rotary six-sided polygon mirror) 115 according to the second embodiment illustrated in FIGS. 15A and 15B are as follows.

First interior angle θ12=value smaller than 120°−0.015°

Second interior angle θ23=120°−0.005°

Third interior angle θ34=value larger than 120°+0.015°

Fourth interior angle θ45=value larger than 120°+0.015°

Fifth interior angle θ56=120°−0.005°

Sixth interior angle θ61=120°−0.005°

Figure 16A:
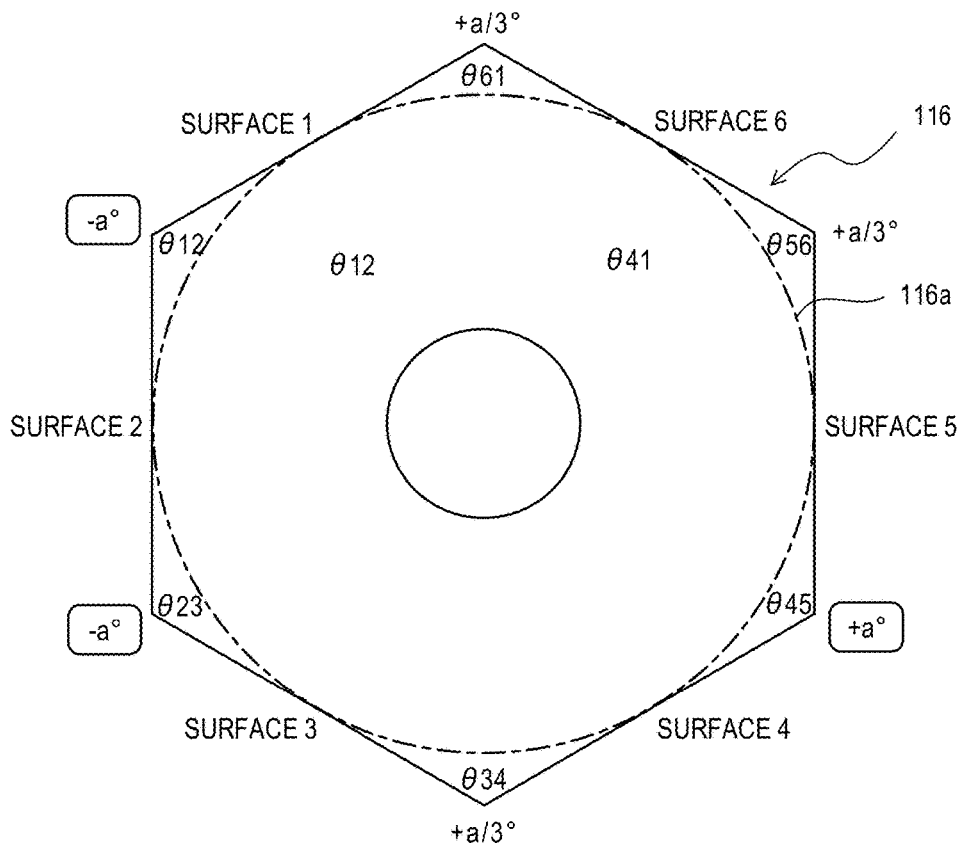
FIGS. 16A and 16B are explanatory diagrams of a rotary six-sided polygon mirror according to the second embodiment.
Figure 16B:
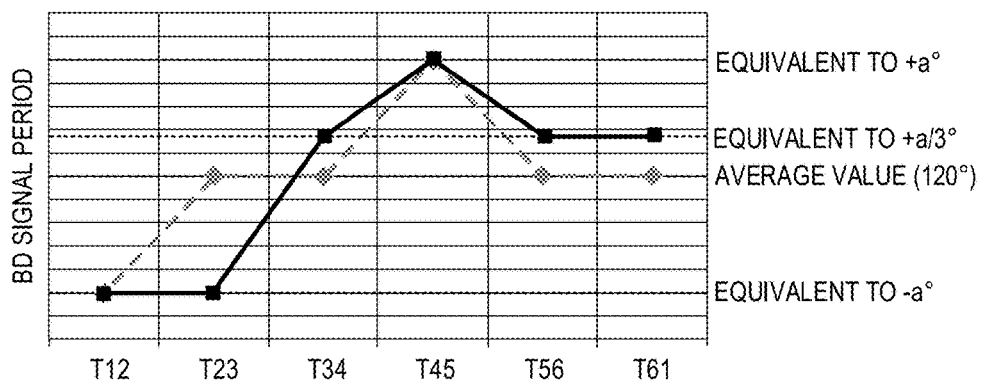

FIGS. 16A and 16B are explanatory diagrams of the rotary six-sided polygon mirror 116 according to the second embodiment. FIG. 16A is a plan view of the rotary six-sided polygon mirror 116 according to the second embodiment. FIG. 16B is a graph for showing the BD signal period of the rotary six-sided polygon mirror 116. In FIG. 16B, the dotted line represents the nominal BD signal period when a difference is provided in the BD signal period among four surfaces as shown in FIG. 13. The rotary six-sided polygon mirror 116 has an inscribed circle 116a in contact with the surfaces 1, 2, 3, 4, 5, and 6.

In the rotary six-sided polygon mirror 116, in order to eliminate the possibility of time T23=time T45, between the second interior angle θ23 and the fourth interior angle θ45, there is provided an interior angle difference that is larger than a permissible difference of 2a°, which is a difference between the maximum value and the minimum value of the manufacturing error of ±a°. At this time, in order to maintain 720° being the sum of the interior angles of the rotary six-sided polygon mirror 116, the third interior angle θ34, the fifth interior angle θ56, and the sixth interior angle θ61 each have a predetermined angle deviation amount of +a/3 from the reference value of 120°. By setting those conditions, the rotary six-sided polygon mirror 116 can eliminate the possibility of causing (2 surfaces)×(3 periods) and (3 surfaces)×(2 periods), which are derived from divisors 2 and 3 of 6 corresponding to the number of corners, even in consideration of the manufacturing error of ±a°. Therefore, the reflection surfaces 1 to 6 of the rotating rotary six-sided polygon mirror 116 can be reliably identified based on the difference in BD signal period.

In this case, the specific nominal values of the interior angles of the rotary six-sided polygon mirror (deformed rotary six-sided polygon mirror) 116 according to the second embodiment illustrated in FIGS. 16A and 16B are as follows.

First interior angle θ12=value smaller than 120°−0.015°

Second interior angle θ23=value smaller than 120°−0.015°

Third interior angle θ34=120°+0.005°

Fourth interior angle θ45=value larger than 120°+0.015°

Fifth interior angle θ56=120°+0.005°

Sixth interior angle θ61=120°+0.005°

In other words, in the rotary six-sided polygon mirrors 115 and 116, the condition of the interior angle difference for enabling the reflection surface identification resides in that the difference of a pair of diametrically opposed interior angles is larger than 0.030°, and the difference between one interior angle adjacent to one of the pair of diametrically opposed interior angles and the other of the pair of diametrically opposed interior angles is also larger than 0.030°.

Third Embodiment

Now, a third embodiment of the present invention will be described. In the third embodiment, the rotary polygon mirror whose number of reflection surfaces is 2n (rotary polygon mirror formed in an even-sided polygon) will be described. In the third embodiment, the structure similar to that in the first embodiment or the second embodiment is denoted by the same reference symbol, and description thereof is omitted herein. The image forming apparatus 100 and the light scanning apparatus 40 of the third embodiment are similar to those in the first embodiment, and hence description thereof is omitted herein.

As described in the first embodiment and the second embodiment, when the rotary polygon mirror is formed in a non-regular polygonal shape to cause a difference in BD signal period, there has been caused such a periodicity that the same pattern is repeated correspondingly to the number of surfaces derived from the divisor of the number of corners of the polygon shape. Then, by eliminating the possibility of causing such a pattern, the reflection surface can be reliably identified based on the difference in BD signal period regardless of the manufacturing error. Then, in the second embodiment, it has been described that it is necessary to set such a condition that the BD signal period differs among at least the number of surfaces corresponding to the number larger by 1 than the second largest divisor among the divisors of the number of corners.

In this case, in the rotary polygon mirror formed in an even-sided polygon whose number of reflection surfaces is even, that is, 2n (n is an integer of 2 or more), the following relationship is satisfied.

TABLE 1

| n | Number of reflection surfaces | Second largest divisor | (Second largest divisor) + 1 |
|---|---|---|---|
| 2 | 4 | 2 | 3 |
| 3 | 6 | 3 | 4 |
| 4 | 8 | 4 | 5 |
| 5 | 10 | 5 | 6 |
| 6 | 12 | 6 | 7 |

That is, in the rotary polygon mirror having even (2n) reflection surfaces, the second largest divisor among 2n corresponding to the number of reflection surfaces is n. The value of (second largest divisor)+1 is n+1. In the rotary polygon mirror formed in an even-sided polygon, in order to prevent (n surfaces)×(2 periods), it is necessary to establish such a relationship that the BD signal period differs among at least (n+1) surfaces. That is, at least between the first interior angle and the n-th interior angle of the rotary polygon mirror formed in a 2n-sided polygon, it is necessary to provide an interior angle difference larger than a permissible difference corresponding to the difference between the maximum value and the minimum value of the assumed manufacturing error. In this case, when the number corresponding to (second largest divisor)+1 (=n+1) is a prime such as 3, 5, or 7, by providing an interior angle difference larger than the permissible difference between the first interior angle and the n-th interior angle, the reflection surface can be reliably identified based on the difference in BD signal period.

On the other hand, when the number corresponding to (second largest divisor)+1 (=n+1) has a divisor other than 1 and n+1, merely providing an interior angle difference larger than the permissible difference between the first interior angle and the n-th interior angle is insufficient. For example, in a case where n+1 is 4 or 6, n+1 has 2 or 3 as a divisor, and hence the same pattern may be repeated in the BD signal period. In view of this, in order to further prevent the occurrence of the periodic pattern that occurs in the divisor period, a condition similar to the above may be set among the divisor surfaces. In this manner, the occurrence of the pattern that inhibits the identification of the reflection surface can be reliably prevented.

The rotary four-sided polygon mirror has been described in the first embodiment, and the rotary six-sided polygon mirror has been described in the second embodiment, but by setting the conditions based on the idea described in the third embodiment, the present invention can be applied to the rotary polygon mirror formed in an even-sided polygon.

According to the embodiment, in the rotary polygon mirror having different interior angles, the image defects can be prevented, and the identification of the reflection surface can be facilitated regardless of the manufacturing error.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-014127, filed Jan. 28, 2015, which is hereby incorporated by reference herein in its entirety.

What is claimed is:

1. A light scanning apparatus, comprising:
   a light source configured to emit a light beam; and
   a rotary polygon mirror configured to deflect the light beam emitted from the light source so that the light beam scans a surface of a photosensitive member,
   wherein the rotary polygon mirror is formed in a six-sided polygon, and
   wherein a difference between a pair of diametrically opposed interior angles of the rotary polygon mirror is larger than 0.03°, and a difference between one interior angle adjacent to one of the pair of diametrically opposed interior angles and another of the pair of diametrically opposed interior angles is larger than 0.03°.

2. A light scanning apparatus according to claim 1, wherein the six-sided polygon has six reflection surfaces which are configured to deflect the light beam and are defined as six sides of the six-sided polygon.

3. A light scanning apparatus according to claim 1, wherein the six-sided polygon has an inscribed circle.

4. A light scanning apparatus according to claim 2, further comprising:
   a signal generator configured to receive the light beam deflected by the six reflection surfaces of the rotary polygon mirror to generate a signal representing a scan starting position of the light beam on the photosensitive member; and
   a processing device configured to identify the six reflection surfaces of the rotary polygon mirror with use of an interval of the signal.

5. A light scanning apparatus according to claim 4,
   wherein the rotary polygon mirror is provided in the light scanning apparatus, and
   wherein the processing device is configured to complete identification of the six reflection surfaces of the rotary polygon mirror during activation of the light scanning apparatus based on the signal generated during the activation of the light scanning apparatus.

6. An image forming apparatus, comprising:
   a photosensitive member;
   a light scanning apparatus including:
      a light source configured to emit a light beam; and
      a rotary polygon mirror configured to deflect the light beam emitted from the light source so that the light beam scans a surface of the photosensitive member,
      wherein the rotary polygon mirror is formed in a six-sided polygon, and
      wherein a difference between a pair of diametrically opposed interior angles of the rotary polygon mirror is larger than 0.03°, and a difference between one interior angle adjacent to one of the pair of diametrically opposed interior angles and another of the pair of diametrically opposed interior angles is larger than 0.03°;
   a developing unit configured to develop an electrostatic latent image, which is formed on the surface of the photosensitive member by the light beam scanning on the photosensitive member, with use of toner; and
   a transfer unit configured to transfer a toner image developed by the developing unit onto a recording medium.

* * * * *